United States Patent
Keyes et al.

(10) Patent No.: US 7,165,043 B2
(45) Date of Patent: Jan. 16, 2007

(54) VALUATION PREDICTION MODELS IN SITUATIONS WITH MISSING INPUTS

(75) Inventors: Tim Kerry Keyes, West Redding, CT (US); Richard Paul Messmer, Rexford, NY (US); Marc Thomas Edgar, Glenmont, NY (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 1011 days.

(21) Appl. No.: 09/745,821

(22) Filed: Dec. 21, 2000

(65) Prior Publication Data

US 2002/0032585 A1    Mar. 14, 2002

Related U.S. Application Data

(60) Provisional application No. 60/173,875, filed on Dec. 30, 1999.

(51) Int. Cl.
*G06F 17/60* (2006.01)
(52) U.S. Cl. .............................. 705/36; 705/35; 705/37
(58) Field of Classification Search .................. 705/37, 705/36, 35
See application file for complete search history.

(56) References Cited

U.S. PATENT DOCUMENTS

| | | | |
|---|---|---|---|
| 6,035,287 A | * | 3/2000 | Stallaert et al. ............... 705/37 |
| 2001/0037278 A1 | * | 11/2001 | Messmer et al. ............. 705/37 |

OTHER PUBLICATIONS

Gath, I. and Geva, A.B., "Unsupervised Optimal Fuzzy Clustering," IEEE Trans. Pattern Anal. Machine Intell., vol. PAMI-11, No. 7, pp. 773-781, Jul. 1989.

Bezdek, James C.; Hathaway, Richard J.; Sabin, Michael J.; and Tucker, William T., "Convergence Theory For Fuzzy c-Means: Counterexamples and Repairs," IEEE Trans. Syst., Man, Cybern., vol. SMC-17, No. 5, pp. 873-877, Sep./Oct. 1987.

Dunn, J.C., "A Fuzzy Relative of the ISODATA Process and Its Use in Detecting Compact Well-Separated Clusters," *J. Cybernetics*, vol. 3, No. 3, pp. 32-57, 1973.

L. Breiman, J.H. Friedman, R.A. Olshen and C.J. Stone (1984), *Classification and Regression Trees*, Chapters 1, 2, 3, 8 and 11, Wadsworth, Belmont, CA.

Brealey, Richard A. and Myers, Stewart, C., *Principles Of Corporate Finance*.

Efron, Bradley and Tibshirani, Robert J., "An Introduction to the Bootstrap," Chapman & Hall publishers.

* cited by examiner

*Primary Examiner*—Vincent Millin
*Assistant Examiner*—Daniel Felten
(74) *Attorney, Agent, or Firm*—Armstrong Teasdale LLP

(57) ABSTRACT

A method of valuation of large groups of assets by partial full underwriting, partial sample underwriting and inferred values of the remainder using an iterative and adaptive supervised and unsupervised statistical evaluation of all assets and statistical inferences drawn from the evaluation and applied to generate the inferred values. Individual asset values are developed and listed in tables so that individual asset values can be rapidly taken from the tables and quickly grouped in any desired or prescribed manner for bidding purposes. The assets are collected into a database, divided into categories by credit variable, subdivided by ratings as to those variables and then rated individually. The assets are then regrouped according to a bidding grouping and a collective valuations established by cumulating the individual valuations.

30 Claims, 14 Drawing Sheets

6 MODELS BUILT:
* MODELS DIFFER BY WHICH VARIABLES USED
* UW ASSETS GET THE MINIMUM ERROR
  PREDICTION (ACTUAL-PREDICTED)

VARIABLES USED

| | MODEL 1 | MODEL 2 | MODEL 3 | MODEL 4 | MODEL 5 | MODEL 6 |
|---|---|---|---|---|---|---|
| LAND AREA | X | | | | X | |
| BLDG AREA | X | | | | X | |
| OLD APPRAISAL | | | | | | X |
| GEN 1 PREDICTED CURRENT APPRAISAL | X | X | X | X | X | |
| GEN 1 PREDICTED REALIZED PRICE | X | X | X | X | X | |
| PROPERTY TYPE | X | X | X | | | |
| LOCATION | | | | X | | |
| COM/RES | X | X | X | X | X | X |
| GROUP (CLUSTER) | X | X | X | X | X | X |

—BY—

248 — BUILD MODELS

250

MODEL "WEIGHTS":
* EACH CELL IS COUNT OF TIMES THE MODEL PRODUCED BEST PREDICTION FOR UW ASSETS
* DETERMINES WEIGHTS FOR AVERAGING PREDICTIONS FOR NON-UW ASSETS

| MODEL ASSET CLASS | GROUP | MODEL 1 | MODEL 2 | MODEL 3 | MODEL 4 | MODEL 5 | MODEL 6 | SUM |
|---|---|---|---|---|---|---|---|---|
| COURT AUCTION COMMERCIAL | 1 | 13 | 13 | 13 | 8 | 32 | 32 | 87 |
| | 2 | 29 | 25 | 29 | 24 | 19 | 19 | 148 |
| TOTAL COURT AUCTION RESIDENTIAL | 1 | 5 | 5 | 10 | 4 | 12 | 12 | 51 |
| | 2 | 4 | 7 | 9 | 13 | 23 | 23 | 59 |
| | 3 | 2 | 15 | 11 | 13 | 8 | 8 | 53 |
| TOTAL | | | | | | | | 163 |
| MARKET VALUE COMMERCIAL | 1 | 16 | 13 | 11 | 15 | 21 | 21 | 86 |
| | 2 | 29 | 22 | 29 | 24 | 19 | 19 | 150 |
| TOTAL | | | | | | | | 236 |
| MARKET VALUE RESIDENTIAL | 1 | 5 | 8 | 4 | 11 | 12 | 14 | 51 |
| | 2 | 8 | 9 | 10 | 15 | 19 | 19 | 59 |
| | 3 | 6 | 16 | 5 | 20 | 2 | 2 | 54 |
| TOTAL | | | | | | | | 164 |

| VARIABLE | CATEGORY/VALUE RANGE | ENCODING SCHEME |
|---|---|---|
| LOAN SECURED | (YES, NO) | YES = 1, ELSE = 0 |
| LOAN TYPE | (REVOLVING, NON-REVOLVING) | REVOLVING = 1 ELSE 0 |
| LAST PAYMENT | (0, 250 MM) | 0 IF LAST PAYMENT = 0 ELSE 1 |
| NOTICE OF DEFAULT SENT | | PRIOR TO JUN 97 EQUALS 1 ELSE 0 |
| ORIGINAL MATURITY DATE | | PRIOR TO JUN 97 EQUALS 1 ELSE 0 |
| SYNDICATED LOAN | (YES, NO) | YES = 1, ELSE = 0 |
| LOAN GUARANTEED | (YES, NO, NAV) | YES = 1, ELSE = 0 |
| COLLECTION SCORE | (0, 1) | |
| LIEN POSITION | (-1, 0, 1) | 1 IF LIEN POSITION = 1 ELSE 0 |
| CURRENT UPAID BALANCE/ORIGINAL BALANCE | (0, 2.9) | NORMALIZED TO (0, 1) |
| LAST PAYMENT TO INTEREST/LAST PAYMENT | (0, 1) | |

FIG. 12

VALUATION PREDICTION MODELS IN SITUATIONS WITH MISSING INPUTS

CROSS REFERENCE TO RELATED APPLICATIONS

This application claims the benefit of U.S. Provisional Application No. 60/173,875, filed Dec. 30, 1999, which is hereby incorporated by reference in its entirety.

BACKGROUND OF THE INVENTION

This invention relates generally to valuation methods for financial instruments and more particularly to rapid valuation of large numbers of financial instruments.

A large number of assets such as loans, e.g., ten thousand loans or other financial instruments, sometimes become available for sale due to economic conditions, the planned or unplanned divestiture of assets or as the result of legal remedies. The sale of thousands of commercial loans or other financial instruments sometimes involving the equivalent of billions of dollars in assets must sometimes occur within a few months. Of course, the seller of assets wants to optimize the value of the portfolio, and will sometimes group the assets in "tranches." The term "tranche" as used herein is not limited to foreign notes but also includes assets and financial instrument groupings regardless of country or jurisdiction.

Bidders may submit bids on all tranches, or on only some tranches. In order to win a tranche, a bidder typically must submit the highest bid for that tranche. In connection with determining a bid amount to submit on a particular tranche, a bidder often will engage underwriters to evaluate as many loans as possible within a tranche and within the available limited time. Up until the time for submitting a bid is about to expire, the bidder will evaluate the loans underwritten at that time, and then attempt to extrapolate a value to the loans that have not then been analyzed by the underwriters.

As a result of this process, a bidder may significantly undervalue a tranche and submit a bid that is not competitive or bid higher than the underwritten value and assume unquantified risk. Of course, since the objective is to win each tranche at a price that enables a bidder to earn a return, losing a tranche due to significant undervaluation of the tranche represents a lost opportunity. It would be desirable to provide a system that facilitates accurate valuation of a large number of financial instruments in a short period of time and understand the associated probabilities of return for a given bid.

BRIEF SUMMARY OF THE INVENTION

In an exemplary embodiment, an iterative and adaptive approach is provided wherein a portfolio is divided into three major valuations. Full underwriting of a first type of valuation of an asset portfolio is performed based upon an adverse sample. A second valuation type is efficiently sampled from categories of common descriptive attributes, and the assets in the selective random sample are fully underwritten. The third valuation type is subjected to statistically inferred valuation using underwriting values and variances of the first and second portions and applying statistical inference to individually value each asset in the third portion. Clustering and data reduction are used in valuing the third portion.

As the process proceeds and more assets are underwritten, the number of assets in the first and second portions increase and the number of assets in the third portion decreases and the variance of the valuation of the assets in the third portion becomes more and more defined. More specifically, the assets in the third portion are evaluated by grouping the assets into clusters based on similarity to valuations of assets in the first and second portions.

A method for predicting value of non-underwritten assets for which data representations are partial or incomplete by projecting values onto the non-underwritten assets from at least one of fully underwritten assets, other non-underwritten assets with complete data representations and available data from non-underwritten assets with partial or incomplete data representations having similar identifiable characteristics is disclosed. The method includes the steps of sampling assets according to risk, underwriting assets and recording valuations, forming market value clusters, building regression models for underwritten assets, selecting the best models for the underwritten assets, counting a number of times the models are selected and using the selected model to make a prediction of underwriting value for the non-underwritten assets.

BRIEF DESCRIPTION OF THE DRAWINGS

FIG. 11 is a pair of tables showing an example of model selection and model weighting for a rapid asset evaluation process;

FIG. 12 is a table showing exemplary attributes for a rapid asset valuation process.

DETAILED DESCRIPTION OF THE INVENTION

Figure 1:
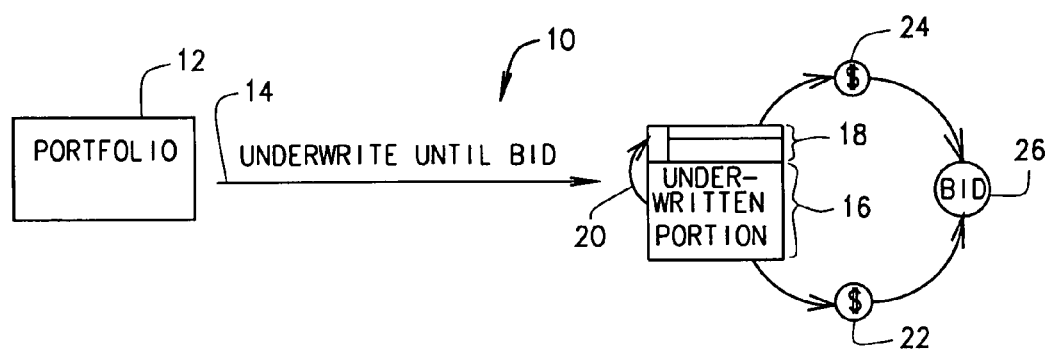
FIG. 1 is a flow diagram illustrating a known process for valuing a portfolio of assets.

FIG. 1 is a diagram 10 illustrating a known process for valuing a large portfolio of assets 12 through an underwriting cycle and through to making a bid for purchasing asset portfolio 12, for example, in an auction. FIG. 1 is a high level overview of a typical underwriting and extrapolation process 10 which is not iterative and not automated. In diagram 10, underwriters underwrite 14 a number of individual assets from portfolio 12 to generate an underwritten first portion 16 and an untouched remainder portion 18. Before any of the assets are underwritten, first portion 16 is zero percent and remainder portion 18 is one hundred percent of portfolio 12. As the underwriting process progresses, first portion 16 increases and remainder portion 18 decreases. The objective is to underwrite as many assets as possible before a bid is submitted for the purchase of asset portfolio. The team of underwriters continues individually underwriting 14 until just before a bid must be submitted. A gross extrapolation 20 is made to evaluate remainder portion 18. The extrapolated value 20 becomes the non-underwritten inferred value 24. The gross extrapolation generates a valuation 24 for remainder portion 18. Valuation 22 is simply the total of the individual asset values in first portion 16. However, valuation 24 is a group valuation generated by extrapolation and may be discounted accordingly. Valuations 22 and 24 are then totaled to produce the portfolio asset value 26. Valuation processes are performed on each tranche of the portfolio.

Figure 2:
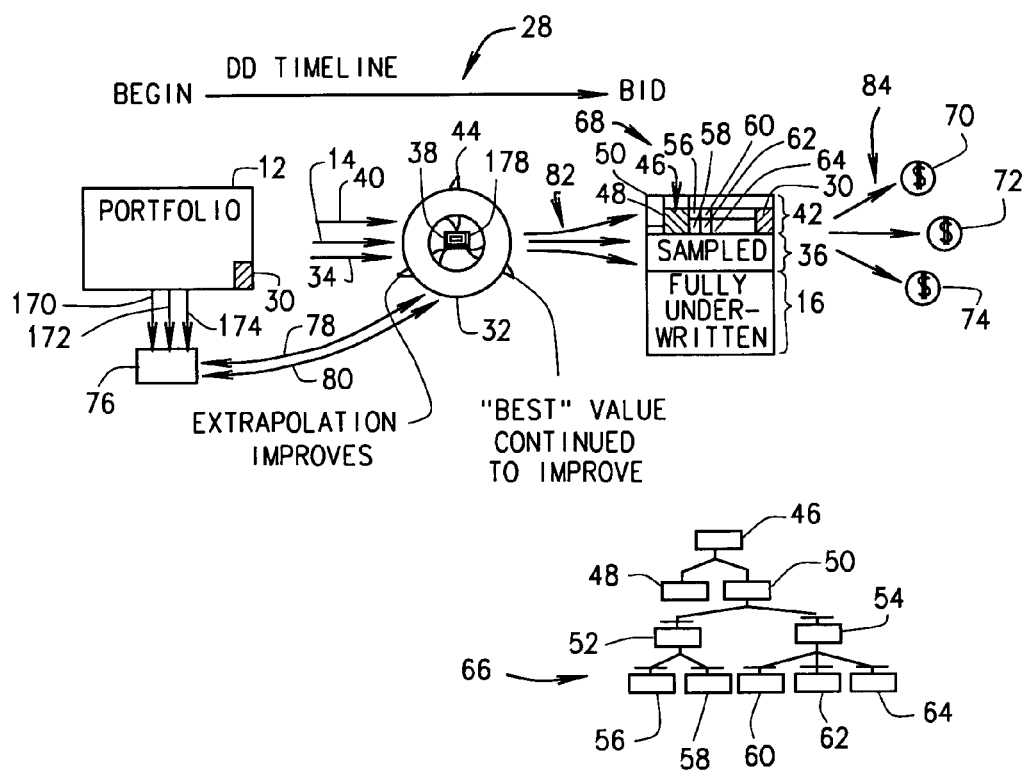
FIG. 2 is a flow diagram illustrating valuing a portfolio of assets in accordance with one embodiment of the present invention.

FIG. 2 is a diagram illustrating one embodiment of a system 28 for rapid asset valuation. Included in FIG. 2 are representations of process steps taken by system 28 in valuating asset portfolio 12. System 28 individually evaluates ("touches") every asset, except for a very small quantity 30 of untouched assets considered statistically insignificant or financially immaterial. Specifically, all assets in portfolio 12 other than quantity 30 undergo an iterative and adaptive valuation 32 in which the assets in portfolio 12 are individually valued, listed individually in tables and then selected from the tables and grouped into any desired or required groups or tranches for bidding purposes (as described below.) As in diagram 10, underwriters begin a full underwrite 14 of individual assets in portfolio 12 to produce a fully underwritten first portion 16 of assets. Underwriters also underwrite 34 a sample of assets in a second portion 36 of portfolio 12, and a computer 38 statistically infers 40 value for a third portion 42 of portfolio 12. Computer 38 also repetitively generates 44 tables (described below) showing values assigned to the assets in portions 16, 36 and 42 as described below. In one embodiment, computer 38 is configured as a stand alone computer. In another embodiment, computer 38 is configured as a server connected to at least one client system through a network (shown and described in FIG. 14), such as a wide-area network (WAN) or a local-area network (LAN).

For example, and still referring to FIG. 2, an unsampled and non-underwritten portion 46 of a third portion 42 of portfolio 12 is subjected to a statistical inference procedure 40 using fuzzy-C means clustering ("FCM") and a composite High/Expected/Low/Timing/Risk ("HELTR") score to generate two categories 48 and 50. HELTR is defined as H—High cash flow, E—Expected cash flow, L—Low cash flow, T—Timing of cash flow (for example in months: 0–6, 7–18, 19–36, 37–60), and R—Risk assessment of borrower (9—boxer used by credit analysts). Category 48 is deemed to have sufficient commonality for evaluation as a whole. Category 50 is further divided into clusters 52 and 54 that are, in turn, further subdivided. Cluster 52 is divided into subclusters 56 and 58, while cluster 54 is subdivided into subclusters 60, 62 and 64. Cluster and subclusters are shown both in a "tree" chart 66 and as boxes in valuation block 68. These individual asset values are then regrouped into tranches 70, 72 and 74 for bid purposes. Any number of tranches could be assembled in any arrangement set by the seller.

Individual asset data (not shown) for each asset in portfolio 12 is entered into a database 76 from which selected data 78 is retrieved based on a given criteria 80 for the iterative and adaptive process 32. When criteria 80 is established for valuation of any asset, that established criteria 80 is stored in database 76 for use in valuating other asset data in database 76 which shares such an established criteria. Iterative and adaptive valuation process 32 thus develops 82 valuations (described below) and groups 84 them for use in bidding.

Figure 3:
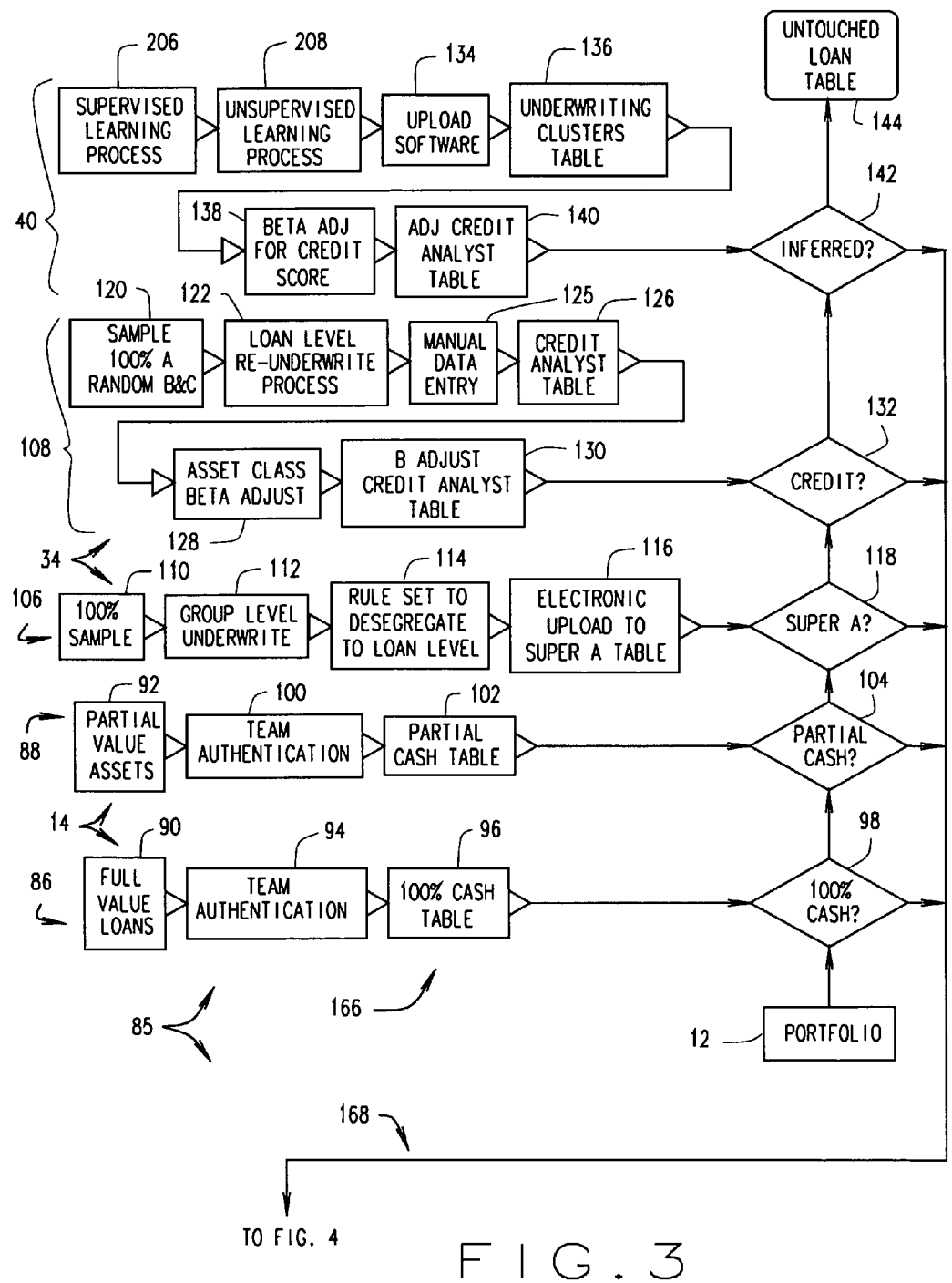
FIG. 3 is a flow diagram illustrating, in more detail, one embodiment of a first portion of a rapid valuation process for large asset portfolios that breaks assets into categories of variance.
Figure 4:
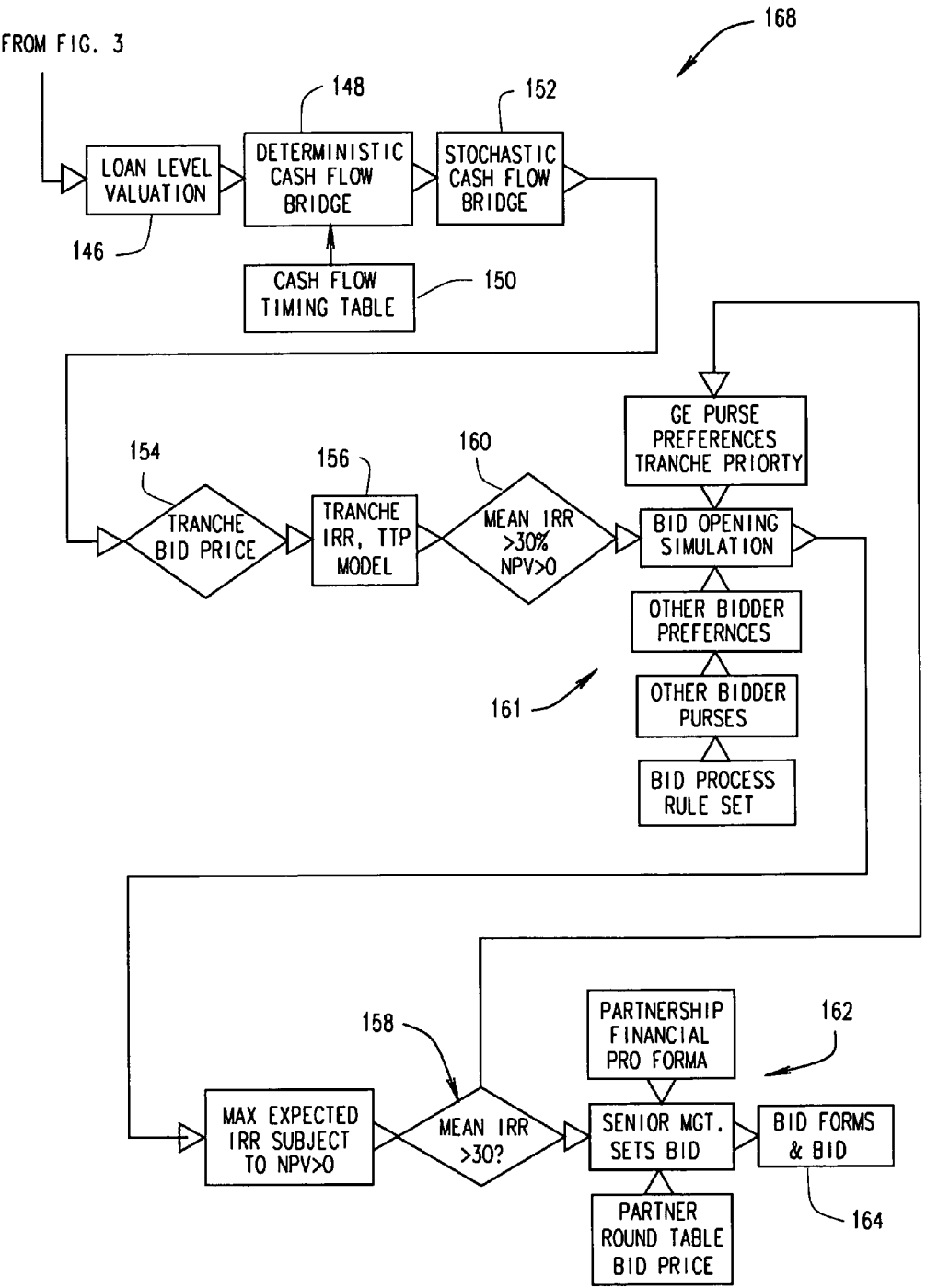
FIG. 4 is a flow diagram illustrating a second portion of a rapid valuation process for a large asset portfolios that aggregates from a basis to a tranche or portfolio basis.

FIGS. 3 and 4 together form a flowchart 85 illustrating a functional overview of one embodiment of system 28 (shown in FIG. 2) for evaluation of a large asset portfolio 12. Valuation procedures 14, 34 and 40 (see also FIG. 2) are simultaneously and sequentially used in system 28 in a manner described below. As described above, full underwriting 14 is a first type of valuation procedure. Grouping and sampling underwriting 34 with full underwriting of the samples is a second type of valuation procedure. Statistical inference 40 is a third type of valuation procedure, which is an automated grouping and automated valuation. Procedures 14, 34 and 40 are based on objective criteria established as described below.

"Underwriting" as used herein means a process in which a person ("underwriter") reviews an asset in accordance with established principles and determines a current purchase price for buying the asset. During underwriting, the underwriter uses pre-existing or established criteria 80 for the valuations. "Criteria" means rules relevant to asset value and a rating based on such categories. For example, as a criteria, an underwriter might determine three years of cash flow history of the borrower to be a category of information relevant to asset valuation and might give a certain rating to various levels of cash flow.

Full underwriting 14 is done in two ways, a full cash basis manner 86 and a partial cash basis manner 88. Both full cash basis manner 86 and partial cash basis manner 88 start with sets 90 and 92 of assets that are fully individually reviewed 14 (see FIG. 2). Such full review 14 is usually due to the large dollar, or other appropriate currency, amounts of the assets being reviewed relative to other assets in the portfolio or due to the borrower being so well known or so reliable that the assets can be quickly and reliably fully underwritten or the assets are marked to market such that there is very little variance associated with the value of said assets. Asset set 90 is evaluated by underwriters 94 and each asset in set 90 receives a valuation with very little variation such as an asset backed with cash or a tradable commodity with full cash value and is placed in a full value table 96. Selected individual values for assets in table 96 are stored as a fully underwritten group value 98.

Set 92 is evaluated by a team of underwriters 100, which could be the same as team 94, but each asset receives a discounted or partial value and is placed in a partial value table 102. Selected individual values for assets in a tranche in table 102 are stored as a partial value fully underwritten group value 104. Criteria 80 (shown in FIG. 2) for full cash basis manner 86 and partial cash basis manner 88 are stored in database 76 (shown in FIG. 2) in a digital storage memory (not shown) of computer 38 (shown in FIG. 2) for use in supervised learning 206 and unsupervised learning 208 of automated valuation 40.

Sampling underwriting 34 is accomplished using two procedures, a full sampling 106 procedure and a partial sampling 108 procedure. Full sampling 106 is utilized for categories of large assets and includes a one hundred percent sampling 110 of the sample groups in the categories of assets being sampled. The assets in full sampling 106 are not individually underwritten but rather are underwritten in full sampling groups 112 based on a determined commonality. A resulting full sampling group valuation (not shown) is created and then desegregated based on a rule 114 to generate an individual full sample asset value table 116. Individual full sample asset values in table 116 are then uploaded electronically into any full sampling group valuation 118 required for bidding as suggested by the grouping of assets in a tranche. The number of assets in an underwriting sample grouping can be as little as one to any number of assets. Partial sampling 108 is for medium categories of assets and includes forming a cluster sample group 120 by one hundred percent sampling of a representative group from within a cluster of the groups being sampled and random sampling of the other groups in the cluster. In partial sampling 108, all groups are sampled, but some are partly valued by extrapolation from cluster sample group 120. Partial sampling 108 includes an asset level re-underwrite 122 with manual data entry 125 to produce an alpha credit analyst table 126 which is given an asset class adjustment 128 to produce an adjusted credit analyst table 130. As described above, individual assets are selected from adjusted credit analyst table 130 according to tranche grouping to produce a partial sampling credit value 132 for use in bidding on tranche 70 (shown in FIG. 2).

Automatic valuation procedure 40 utilizes supervised learning process 206, an unsupervised learning process 208 and an upload from a statistical inferencing algorithm 134 to generate an underwriting clusters table 136 which is stored in a digital storage device. In supervised learning process 206, an experienced underwriter who knows what questions to ask to establish value, assists the computer in determining whether or not an asset is a good investment and how to value the asset. In unsupervised learning process 208, the computer segments and classifies assets and objectively self-evaluates the assets based on feedback from the data. An underwriter periodically reviews the unsupervised learning process 208 to determine whether the computer is making sensible underwriting conclusions. The computer uses statistical algorithms 134 to make its inferences. For example, but not by way of limitation, one embodiment uses the Design For Six Sigma ("DFSS") quality paradigm developed and used by General Electric Company and applied in a Due Diligence ("DD") asset valuation process using a multi-generational product development ("MGPD") mode to value the asset data with increasing accuracy. Learning processes 206 and 208 incorporate the accumulated knowledge as the valuation progresses into cash flow recovery and probability of recovery calculations on an ongoing, real time basis. Supervised learning process 206 uses business rules to identify clusters of assets having common aspects for valuation purposes. Unsupervised learning process 208 uses feedback from prior data valuations performed by procedure 40 to determine if progress is being made with respect to increasing valuation confidence. Identification of all available raw data and discovery of interrelationships of clusters of these available raw data is possible due to the use of high-speed computers, as is described below.

In one exemplary embodiment, a fuzzy clustering means ("FCM") process of unsupervised organization of raw data using a HELTR scoring technique is employed to infer valuations of credit scores onto assets in portfolios, as described below. Such clustering techniques have been developed in response to more sophisticated classification segments to describe assets and high asset counts in portfolios that must be assessed in time periods that do not allow manual processing.

One exemplary method first organizes valuation scores (static and/or probabilistic recoveries) in a computerized system. Adjustments are then made to the valuation scores for special factors and business decisions. Then a reconciliation of multiple valuation scores describing the same asset and an overall adjustment to interview/override the inferred valuation is performed.

Organizing valuation scores is performed by collating, in electronic form, a cluster number, a cluster name, descriptive attributes of the cluster(s), probabilistic recovery values (an illustrative example is a HELTR score) and the underwriter's confidence in each cluster's valuation based upon the strengths of each cluster's descriptive attributes. The cluster number is a unique identifier of a specific set of descriptive attributes that are facts about an asset which a person skilled in evaluations uses to assess value of an asset. Examples of descriptive attributes include, but are not limited to, payment status, asset type, borrower's credit worthiness expressed as a score, location and seniority of a claim. The cluster name is, in one embodiment, an alphanumeric name that describes the cluster's descriptive attributes or sources. One example of descriptive attributes is found in FIG. 12, described below.

Descriptive attributes are the facts or dimensions or vectors that were used to develop the asset's value. Computer logic is used to check for replicated clusters, if any, and alert the analysts or underwriters.

Because each asset can be described by many combinations of descriptive attributes, various levels of value for the same asset may occur. Probabilistic recovery values or credit score or any numerical indication of the asset's worth are indicators of worth designated at the discrete asset level. All of the information from the various descriptive attributes is synthesized such that a purchase or sale price can be ascertained as a fixed value or a probabilistic one. An illustrative embodiment used herein is the HELTR score. Each cluster has a unique set of descriptive attributes and designated HELTR score.

Every cluster's unique attributes contribute to a valuation of cluster value. Different combinations of attributes provide a higher confidence or confidence interval of a particular cluster's score. For example, if any asset was described as a green piece of paper with height equal to 2.5" and width equal to 5"—one might ascribe a value of 0 to 1000 dollars and place very little confidence in this assessment. If this same asset was described with one more fact or attribute or vector as being a real $20 US bill, one would place a very high confidence factor on this cluster value of $20 US dollars.

A cluster's valuation and confidence is determined at a point in time and recorded. Sometimes new information becomes available and the analyst would like to alter the value(s). The value is altered manually or automatically with a data field and decision rules, in the automated fashion via computer code. The prior values are manipulated to reflect new information. As an illustrative example, assume the prior cluster confidence was recorded at 0.1 and it is learned that a different asset with exact descriptive attributes as in this cluster just sold for over the predicted "most probable" value. Rules were in effect such that if this event occurred, cluster confidence is multiplied by 10. $0.1 \times 10 = 1$ which is the revised cluster confidence.

The purpose of such a process is to reconcile multiple scores for the same asset, controlling for the confidence associated with each source of valuation of each dimension of valuation. Using the HELTR as an illustrative example with sample data points on a particular asset:

In one embodiment, expected values and deviations are displayed in multi-dimensional displays to make variations from expected values easy to identify.

| Cluster Number | Cluster Name | High | Exp | Low | Time | Valuative Confidence | High | Exp | Low | Time |
|---|---|---|---|---|---|---|---|---|---|---|
| 1 | Lien positions-recourse | 85 | 62 | .15 | 3 | 3 | (.3/1 65)(.85) | (3/1.65)(.62) | (3/1.65)(.15) | (3/1 65)(3) |
| 2 | Asset classification -industry-age | 45 | .4 | .31 | 3 | .7 | (.7/1.65)(.45) | (.7/1. 65)(.4) | (.7/1 65)(.31) | (.7/1.65)(3) |
| 3 | Coordinates-use-borrower | 9 | .5 | 2 | 2 | .65 | (.65/1.65)(.9) | (65/1.65)(.5) | (65/1 54)(.2) | (65/1 65)(2) |
| n | x | | | | | 1 65 | .6999 | .4792 | .2374 | 2 6059 |

The cluster consensus valuation is a high value of 0.6999, most likely 0.4792, low 0.2374 with a timing of 2.6059. Different logic can be applied to manipulate any of the weights.

The consensus scores are developed in the context of global assumptions. Should a global assumption change occur, process steps 128, 138 are included in the methodology to weight the consensus score. Illustrative examples are fraud discovery in certain valuation factors, macroeconomic changes, fungible market value established for an asset class, and loss of or increase of inferenced asset valuation methodologies relative to other methodologies being employed.

In another embodiment, a cross correlation tool is used to quickly understand and describe the composition of a portfolio. Typically, the tool is used to correlate a response of a user selected variable versus other variables in an asset portfolio. The tool quickly identifies unexpectedly high or low correlation between two attribute variables and the response variable. Attribute variables are of two types, continuous and categorical. The cross correlations are computed by the correlation tool between all variables of interest and their bin or level and presented, in one embodiment, in a two dimensional matrix for easy identification of trends amongst the assets in the portfolios.

First, the cross-correlation tool identifies attribute variables in the portfolio of assets as one of continuous or categorical. For each variable aggregation levels are computed by bins for continuous variables and by value for categorical variables.

A user looking to identify correlations with the tool will select a response variable, $Y_r$, for example, an expected recovery or count. For all combinations of pairs of attribute variables (x1 and x2) and their levels (a and b), compute the average value of the response variable, $Y_r$, according to:

$Y_r = \text{sum}(Y(x1=a \text{ and } x2=b))/\text{count}(x1=a \text{ and } x2=b)$.

An expected value, $Y_{expect}$, of the response variable is calculated according to:

$Y_{expect} = (\text{sum}(Y(x1=a))^*\text{count}(x1=a) + \text{sum}(Y(x2=b))^* \text{count}(x2=b)))/(\text{count}(x1=a)^*\text{count}(x2=b))$.

A deviation, $Y_{error}$, of the chosen response variable, $Y_r$, from the expected value, $Y_{expect}$, using weighted values of occurrence of x1=a and x2=b separately, is calculated by:

$Y_{error} = Y_r - Y_{expect}$.

In another exemplary embodiment, a transfer function process that converts raw data into the ultimate bid price is used, as described below. Table 136 is electronically adjusted using modified coefficients developed in procedures 14, 34 and 40 to give a coefficient adjustment to a credit score 138 for the asset and to generate an adjusted credit analyst table 140 of inferred individual asset credit values. Individual asset values are taken from table 140 as required by tranche grouping to generate an inferred credit valuation 142. Finally an extrapolation is made on the negligible remainder 30 of "untouched" assets to generate a table of untouched assets 144. Values from table 144 are selected to generate an untouched asset valuation.

Full cash valuation 98, partial cash valuation 104, full sampling credit valuation 118, partial credit values 132, inferred credit value 142 and any value assigned from untouched asset table 144 are cumulated and are mutually exclusive with the priority being fall cash valuation 98 to inferred credit value 142 consecutively. A sum of the valuations represents value of the portfolio.

FIG. 4 is a flow diagram of a bid preparation stage 168 performed by system 28 (shown in FIG. 2). The cumulated valuations 98, 104, 118, 132, 142 and 144 are combined in a risk preference loan level valuation step 146. A deterministic cash flow bridge 148 is produced using a cash flow timing table 150 to develop a stochastic cash flow bridge 152. A stochastic or probabilistic cash flow bridge 152 is created and used to determine a proposed tranche bid price 154 to which is applied a tranche model 156 iteratively until a certain threshold 158 is reached. Threshold 158 is, for example, an internal rate of return ("IRR") greater than some value, a certain time to profit ("TTP"), and a positive net present value ("NPV").

In general, NPV is defined as:

$$NPV = c_0 + \frac{c_1}{1+r} \quad \text{(Equation A)}$$

where $C_0$ is the investment at time 0, $C_1$ is the expected payoff at time 1, and r is the discount factor. The basic idea is that a dollar today is worth more than a dollar tomorrow.

In the case of insurance policies, NPV is defined as:

$$NPV = \sum P - \sum E - (\sum C) \times \frac{A}{E_w} \quad \text{(Equation B)}$$

where P is the premium, E is the expected nominal cost, and C is the claim cost. In essence, Equation B is how net income as the difference of profit and weighted expected risk is generated. Note that the summation is summing across all the policies in a specific segment. Also note that all the premium, nominal cost, and claim cost have been discounted before entering the equation. As a result, a profitability score is generated.

If threshold conditions 160 are met, bid 154 is subjected to a simulated bid opening analysis 161 to predict whether the bid can be expected to be a winning bid. An outcome of a sealed bid auction depends on sizes of the bids received from each bidder. Execution of the auction involves opening all of the bids and selling the items up for auction to the highest bidder. In traditional sealed bid auctions, bidders are not allowed to change their bids once their bid is submitted and bidders do not know the bids placed by other bidders until the bids are opened, making the outcome of the auction uncertain. By placing higher bids, a probability that the auction will be won is higher, but value gain is lower if it was possible to have won the auction at a lower price.

Simulating competitive bidding increases the probability of capturing the highest upside of profitability by setting a range of bid/sale prices that have a propensity to exhaust any competing bidder's purses before ones own purse such that the most desirable assets transact with the highest preservation of capital. Pricing decisions are brought into focus by an analytically robust process because pure anecdotal business judgment can be augmented by a data driven approach not subject to a hidden agenda, personality or unilateral knowledge.

Each potential bidder has a range of possible bids that might be submitted to a sealed bid auction. The range of bids can be expressed as a statistical distribution. By stochastically sampling from a distribution of bid values, one possible auction scenario may be simulated. Further by using an iterative sampling technique, for example a Monte Carlo analysis, many scenarios are simulated to produce a distribution of outcomes. The distribution of outcomes include a probability of winning the auction item(s) and the value gain. By varying the value of ones own bid, a probability of winning the auction against ones own bid price can be determined.

The following core elements are used to simulate a competitive bidding yield, codification of market rules and contracts into computerized business rules, codification of potential competition/market forces, forecasted budgets and priorities into a preference matrix, one's own bidding capacity, preferences, risk/return tradeoffs agreed to codified into a preference matrix, and a computerized stochastic optimization.

Analysis 160 simulates a competitive environment with other companies having various financial capabilities bidding against the bids calculated by system 28. In one embodiment, analysis 160, for example and without limitation, includes a total bid limit such as would be the case where the total value of the assets exceed the financial capabilities of the entity using system 28. In one embodiment, analysis 160 might assess the profitability, in such case of limited resources to bid, of bidding on various combinations of tranches. Analysis 160 also takes into account past history in bidding against known competitors and information on the various types of assets preferred by competing bidders. In analysis 160, the tranche bid is then evaluated and set by management 162 and a final tranche bid 164 made. All valuations prior to the making of the bid 164 can be repeated as desired. Further, since the process is self-adjusting and iterative, the tranche bid price 164 tends to climb upward with each iteration as more and more value is found by the iterations performed by system 28.

The process described by flowchart 85 includes an evaluation stage 166 (shown in FIG. 3) and a bid preparation stage 168 (shown in FIG. 4). Evaluation stage 166 includes procedures 14, 34 and 40. Evaluation stage 166 runs constantly until stopped, with the automatic valuation procedure 40 and sampling procedures 34 attempting to find extra value in various assets or categories of assets.

Referring once again to FIG. 2, and in accordance with rapid asset valuation, data categories 170, 172 and 174 within the assets of portfolio 12 are identified on each asset and stored in database 76. Iterative and adaptive valuation process 32 takes portions of selected data 78 and applies criteria 80 to the portions of selected data 78 in a statistical manner to increase the known asset value rather than the asset value being a gross extrapolation 20. In accordance with method 28 the assets are divided into at least first portion 16, second portion 36 and third portion or remainder 42. Using procedure 14, the assets in portion 16 are fully underwritten to determine valuation 98 and partial value fully underwritten valuation 104 and to establish criteria 80 for such valuation. Using procedure 34, process 28 samples a quantity of assets from second portion 36 representative of groups in second portion 36 to determine full sampling group valuation 118 and partial sampling credit values 132 for second portion 36 and to establish additional criteria 80 for such valuation. Using procedure 40, partially supervised learning process 206 and partially unsupervised learning process 208 are performed by an automated analyzer such as computer 38 of FIG. 2. In order to learn, the automated analyzer extracts established criteria 80 and selected data 78 as to third portion or remainder 42 and divides third portion 42 into portions 46, and then further divides each portion 46 into categories 48 and 50 and category 50 into clusters 52, 54 and clusters 52, 54 into subclusters 56, 58, 60, 62 and 64 using criteria 80 imported from database 76 and each of processes 206 and 208. Individual asset valuations are established for the assets in subclusters 56, 58, 60, 62 and 64 by statistical inference.

The individual asset valuations are listed in cluster tables 136 (see FIG. 3) and after adjustment 138, listed in a credit analyst table 140. The established criteria 80 are objective since criteria 80 come from database 76 where they have been placed during full underwriting procedure 14 and sample underwriting procedure 34. In other words, information obtained in full value table 96, partial value table 102, table 116, alpha credit analyst table 126, adjusted credit analyst table 130, adjusted credit analyst table 140 and untouched asset table 144 for all assets is placed into database 76 in a digital storage device, such as the hard disk storage 178 of computer 38, and correlations are made by procedure 40 with criteria 80 from procedures 14 and 34. During procedure 40, criteria 80 which are of statistical significance with an acceptable degree of reliability, are entered. That is, procedure 40 iteratively learns as it values and establishes criteria 80. Supervised learning process 206 and unsupervised learning process 208 increase the accuracy of statistically inferred valuation 142 by correlating to established criteria 80 in database 76 on assets in fully underwritten first portion 16 and assets in sample underwritten second portion 36. Selected data 78 related to one or more assets in third portion 42 similar to selected data 78 on assets in portions 16 and/or 36 are located in database 76 and then by statistical inference, a value for each asset in third portion 42 is determined from the located information.

During the process described by flowchart 85, assets are valued at an individual asset level, and the individual asset values are tabulated or grouped in one or more combinations. To have maximum flexibility for various bidding scenarios, any subset of portfolio 12 is valued and priced separately in a particular time frame. In known process 10, if a seller of assets regroups the assets, for example from groupings by asset company to groupings by geographical location of borrowers, revaluation of bids may be inadequate because gross extrapolation 20 will need to be performed. In using system 28, because individual asset values are developed and listed in tables 96, 102, 116, 130, 140 and 144, these values can be electronically regrouped into different valuations 98, 104, 118, 132, 142 whose "food chain" selection criteria is mutually exclusive and selectable by the analysts conducting the evaluation and is further described below. If the seller groups the assets, then grouping according to seller groups or tranches is easily made and an appropriate valuation 146 developed for that tranche. The individual asset values are thus easily regrouped for third portion 42 to objectively obtain an inferred valuation 142 for that group or tranche.

Many methods may be employed to establish asset value. Depending upon the objectives of the valuation, the relative merits of different valuation methodologies establish the desirability of the valuation techniques for a particular asset. One methodology is similar to a "food chain" which preserves assumption development methods yet selects the intervals with the highest confidence intervals.

In one introductory illustrative example of a food chain, one may prefer to value a financial asset more by what similar assets trade in the open market for versus an individual's opinion. In rank order, the market-to-market value is selected over an individual's opinion.

In the same way assets in a portfolio with a forecasted cash flow recovery may be evaluated by a number of valuation techniques. The typical objective is to establish, with as high a probability available, what the future cash flow will be. The valuation methodologies are ranked in order of their capability to accurately quantify cash flow, or cash equivalent, forecasts with the least downside variances and/or maximum upside variances. The asset is valued by all available methods that have merit, or may have business logic rules to eliminate duplicate work when it is known that more accurate methods will preclude the need to assess an asset's valuation once the best method has been employed.

In order to provide the best forecast of asset value, assets are evaluated by each method within a food chain until such time as they are valued by the best available method for each particular asset. Once this best value is found, the asset is said to have its value, irrespective to other values lower (with more variance) in the food chain and is sent to the completed state.

As an example, a portfolio of assets is evaluated using a food chain. The first valuation method in the food chain is the one which most closely matches the valuation objectives—namely to find the value with the highest degree of accuracy (tightest confidence interval). As soon as the asset is valued by a methodology for which a value was established for that unique asset, it is sent to the valuation table and removed from any further steps in the food chain. A list of assets from the original portfolio that did not match any valuation methods is kept in the untouched asset table. The objective is to drive this untouched table to zero assets.

One example of a food chain is as follows, in order of preference. (a) 100% cash in hand for the asset, (b) partial cash in hand for the asset, (c) liquid market value for like asset, (d)direct underwrite, and (e) inferred underwrite.

The food chain approach provides an ability to find the best probability distribution shape, reduces probability distribution variance (especially on the downside tails), provides capability to establish probability distributions quickly while preserving all available knowledge in the constituencies and provides the ability to provide the best estimate of value at any point in the discovery process.

As shown in FIG. 4, the general framework of bid preparation stage 168 is to price bid 164 similar to option valuation paradigms where the winning investor will have the right, but not the obligation, to recover the investment. The values are desegregated into three parts for each tranche, a time value of money component, an inherent value component and a probable cash flow component. The time value of money and the inherent value are deterministically calculated and have little variation once established. The time value of money is computed by taking a firm's cost of capital for a low risk investment multiplied by the investment for the applicable period which represents an opportunity for alternate investment that is foregone in order to make the present investment. Inherent value is a known liquid asset value, which is in excess of the purchase price and is available immediately after taking control of the assets. One embodiment is a well traded security purchased below market value as part of a portfolio. Probable cash flow variance is a function of the assumptions a due diligence team makes and the process it selects to convert raw data into a cash flow recovery stream. The systems described herein are configured to reduce negative variances and find value.

Figure 5:
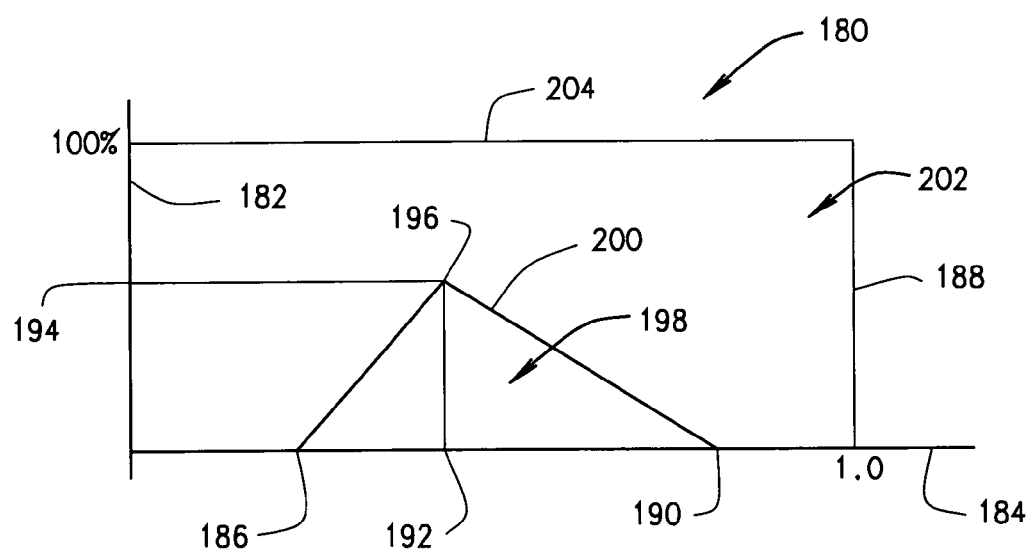
FIG. 5 illustrates a probability distribution for exemplary assets whose recovery value is inferred.

FIG. 5 is a triangular probability distribution graph for a typical minimum three-point asset evaluation 180. In accordance with process 40 a minimum of three cases per financial instrument are evaluated. A vertical axis 182 denotes increasing probability and a horizontal axis 184 denotes increasing portion of recovery. A liquidation or worst case percentage 186 of a face value line 188, a best case percentage 190 of face value 188, and a most probable case percentage and recovery value 192 of face value 188 are shown. The probability of worse case percentage 186 is zero, the probability of best case scenario 190 is zero and a probability 194 of the most probable percentage 192 of recovery is a value represented by point 196. The size of an area 198 under a curve 200 defined by a line connecting points 186, 196 and 190 is representative of value in the asset. The notational asset value holds to an area 202 of a rectangle bounded by a 100% probability line 204 of a 100% recovery of face value 188 is a measure of the portion of face value 188 that can be attributed to the asset represented by curve 200. Points 186, 196 and 190 and lines 188 and 204, and thus areas 198 and 202, will vary depending on selected data 78 chosen for the asset in question and criteria 80 applied to the asset and ascribed probabilities of asset value recovery. Horizontal axis 184 can be expressed in currency units (e.g. dollars) rather than percentage of face value. When currency units are used, areas 198 under curves 200 for different assets will be in currency units and thus areas 198 relate to each other in magnitude and hence in significance to overall bids 70, 72 and 74. The more that is known about the asset, the more curve 200 can be refined. Statistics are applied to curve 200 as criteria 80 are established to help establish the location of points 186, 196 and 190 and hence area 198 and thus the expected value of the asset. The timing of cash flows, which affects value, can be based upon histogram results of the timing attributes.

For example, the cash flow recovery timing can be broken down into three bins of 0–6 months, 7–12 months, 13–18 months, and so on. The automated analyzer 38 using algorithm 134 can select the bin width based upon a sensitivity study trade off of timing to valuation against the gauge recovery and rate determined possible by an underwriter. In an exemplary embodiment, a minimum of 4 bins should be utilized when the discount factor is more than 25%. For a discount factor between 10 and 25, a minimum of 6 bins should be used to cover the likely recovery periods.

In accordance with procedure 40 other sources of data are chosen that an underwriter would be able to utilize to assess value in a financial instrument. Criteria 80, established by underwriting teams 94, 100 114, 122 and 140 in procedures 14 and 34, are useful in that regard. In accordance with the process described by flowchart 85, raw data is turned into a recovery and a rule set is selected to apply a valuation to the raw data and this rule set is coded into the valuation database in the form of criteria 80. Each time a cluster is touched by multiple hits during a valuation in procedures 14, 34 or 40, a consensus forecast is developed and applied to the cluster. In accordance with system 28, the probability distributions of cash flows and timing at the tranche level is determined by developing valuation transfer function 146 at the asset level which will take raw data, rationalize the assumptions that data will generate and aggregate the valuations of the individual assets in the tranche.

Since all recoveries are not homogeneous, a method to establish the variability of cash flow recoveries is provided. Individual assets are clustered by group exposure. As much face value as possible is traditionally underwritten in the time permitted, recognizing that a sizable sample remains for clustering. Clustering reserves are estimated using a sample size equal to one hundred forty five plus 2.65% of the face count and a regression analysis of variance. This produces sample sizes of thirty for a face count of 100 assets, 150 for a face count of 1,000 assets, 400 for a face count of 5,000 assets, 500 for a face count of 10,000 assets, and 600 for a face count of 20,000 assets.

During statistical inference procedure 40, assets remaining in third portion 42 of portfolio 12 are clustered by descriptive underwriting attributes or criteria 80 and random samples are taken from each cluster and the sample underwritten. In one embodiment, sampling from a cluster in procedure 40 is stopped when asset level mean variance falls below 10%. In another embodiment, sampling is stopped when tranche level mean variance falls below 15%. Portfolio mean variance is not used as a stop point if the potential unit of sale is less than the entire portfolio. In accordance with procedure 40, recovery valuation of the cluster sampling is inferred onto the corresponding cluster population. In using system 28, the goal is to touch each inferred asset valuation via three or more unique clusters. During procedure 40 a cluster's underwriting confidence and descriptive attribute's relevance is weighed.

By way of example, without limitation, 0=no confidence that this cluster's descriptive attributes will provide a meaningful valuation; 1=complete confidence that this cluster's descriptive attributes will provide as accurate of a valuation as individually underwriting each instrument, and numbers between 1 and 0 indicate partial confidence in the valuation. Reconciliation of these values occurs within adjusted credit analyst table 130. In procedure 40 cash flow at asset level is then adjusted by macroeconomic coefficients within adjusted credit analyst table 140. Macroeconomic coefficients are, in one embodiment, associated with major asset classes such as for example, without limitation, real-estate residential loan or commercial equipment loan. The coefficients can be globally applicable, such as by way of example without limitation, legal climate, gross domestic product ("GDP") forecast, guarantor climate, collections efficiency, borrower group codes, and the like.

One method for sampling a portfolio includes searching among key asset, borrower, and collateral characteristics for attributes which heavily influence/generate risk. Table A below provides one example list of portfolio attributes in an asset valuation scenario.

TABLE A

| Portfolio attributes |
| --- |
| Borrower Size (by Borrower Group UPB) |
| Secured |
| Syndicated (yes/no) |
| Guaranteed |
| Loan Type (Term. Revolving, etc.) |
| % UPB from Liens in First Position |
| Collection Score (0 = Bad, 1 = Good) |
| 12-month collections % of UPB |
| % of Last Payment for Principal |
| # Borrower Loans |
| Loan's portion of borrower UPB |
| Single Family Residence |
| Residential |
| Retail |
| Industrial |
| Hospital |
| Hospitality |
| Multifamily |
| Land Developed/Undeveloped/Other |
| Office |
| Stock/Margin Loans |

Segmentation of the asset attributes is accomplished by encoding of attributes into "dummy variables". For example, a common asset attribute is "Has borrower made a payment in the last 12 months?", which would be encoded in a variable as a "1" if the answer is yes, and "0" otherwise. Similar "dummy variables" are used for other asset attributes.

The segmentation procedure is completed by using any statistical procedure which process the encoded asset attributes in such a way so as to segment the portfolio into groups of similar assets. One such algorithm is K-means clustering. In an example, where three asset attributes, Unpaid Principal Balance (UPB), Probability of Payment, a scale from 0 to 1; and Secured Score, a probability of being secured by real estate collateral are used, the assets might be classified into five groups with similar attributes.

Once the groupings of assets is made, the number of samples to be taken and submitted for further underwriting review is calculated by establishing the confidence level with which statements can be made about the total recoveries in each segment (k), establishing the precision with which one wishes to estimate the total recoveries in each segment (h) and providing an a priori estimate of the level and range of recoveries as a percentage of total Unpaid Principal Balance (UPB) (R), according to:

$$Var(\hat{Y}_R) = n\left[1 - \frac{n}{N}\right] \times \frac{\left[\sum_1^N x_i\right]^2}{\left[\sum_1^n x_i\right]^2} \times \frac{\sum_1^N (y_i - Rx_i)^2}{N-1}$$

n=sample size
N=cluster size
$x_1$=UPB for sample i
$y_1$=recovery for sample i $$R = \frac{\sum_1^N y_i}{\sum_1^N x_i} = \text{cluster expected recovery \%}$$

$$h^2 = k^2 \times n\left[1 - \frac{n}{N}\right] \times \frac{\left[\sum_1^N x_i\right]^2}{\left[\sum_1^n x_i\right]^2} \times \frac{\sum_1^N (y_i - Rx_i)^2}{N-1} \quad \text{(Equation C)}$$

h=error tolerance for estimating $$Y = \sum_1^N y_i \text{ with } \hat{Y}_R$$

$$\hat{Y}_R = \hat{R} \times \sum_{i=1}^N x_i = \frac{\sum_{i=1}^n y_i}{\sum_{i=1}^n x_i} \times \sum_{i=1}^N x_i \quad \text{(Equation D)}$$

-continued $$= \frac{\sum_{i=1}^n \rho_i x_i}{\sum_{i=1}^n x_i} \times \sum_{i=1}^N x_i$$

k=constant in Tchebyshev's Formula:

$$\left|\hat{Y}_R - \mu_{\hat{Y}_R}\right| \leq k\sqrt{Var(\hat{Y}_R)} \text{ with probability} \geq 1 - \frac{1}{k^2}$$

By solving Equation C for n, required sample size for the given cluster is obtained. Solving Equation C further allows the user to state, with probability $$1 - \frac{1}{k^2}$$

the calculated sample size, n, and associated underwritten values will estimate the total cluster recoveries to within an error of h, assuming that estimates of total segment recoveries are determined using Equation D.

In practice, it is difficult to estimate variability in total recoveries without available data. A spreadsheet tool implements the above by generating data in a Monte Carlo simulation, and guiding the user through an analysis of the results until a favorable sample size is derived.

Table B provides an example output from a study of a group of 20 loans, with estimated (expected) recoveries between 20% and 30% of UPB, and a range of UPB between 1MM and 2MM. Eight samples are needed to estimate the total recoveries for the 20 loans to within 10% of actual, with 75% confidence.

TABLE B

Sample Size Spreadsheet Wizard

| Sample Size | Exp Rec | Cume Exp Rec | Cume UPR | Exp Rec % | Residual | N (cluster size) | (sample size) | Expected Recovery % | | |
|---|---|---|---|---|---|---|---|---|---|---|
| 1 | 779,131 | 779,131 | 2,936,279 | 26.5% | | 20 | 8 | 27.5% | | |
| 2 | 716,951 | 1,496,082 | 5,447,631 | 27.5% | 24,259 | Face Range | ER % Range | Face Value | | |
| 3 | 359,327 | 1,855,409 | 6,702,090 | 27.7% | 12,042 | 2,000,000 | 5.0% | 44,160,329 | | |
| 4 | 481,798 | 2,337,206 | 8,538,875 | 27.4% | (20,956) | Min Face | Min ER % | Expected Recovery | | |
| 5 | 606,774 | 2,943,980 | 10,706,452 | 27.5% | 10,750 | 1,000,000 | 25.0% | 12,123,821 | | |
| 6 | 418,899 | 3,362,880 | 12,207,495 | 27.5% | 5,397 | Confidence | k | Precision | Precision % | |
| 7 | 622,516 | 3,985,396 | 14,609,180 | 27.3% | (32,665) | 75.0% | 2.00 | 1,212,382 | 10.0% | |
| 8 | 594,799 | 4,580,195 | 16,911,278 | 27.1% | (28,694) | | | | | |
| 9 | 713,922 | 5,294,117 | 19,440,132 | 27.2% | 25,241 | | | | | |
| 10 | 494,230 | 5,788,346 | 21,153,615 | 27.4% | 25,363 | | | | | |
| 11 | 735,334 | 6,523,680 | 24,031,814 | 27.1% | (45,983) | | | | | |
| 12 | 683,155 | 7,206,835 | 26,387,193 | 27.3% | 39,857 | | | | | |
| 13 | 748,413 | 7,955,248 | 29,256,251 | 27.2% | (31,730) | | | | | |
| 14 | 419,885 | 8,375,133 | 30,726,773 | 27.3% | 19,068 | | | | | |
| 15 | 757,050 | 9,132,183 | 33,682,971 | 27.1% | (44,439) | | | | | |
| 16 | 553,674 | 9,685,857 | 35,690,262 | 27.1% | 8,922 | | | | | |
| 17 | 761,579 | 10,447,435 | 38,234,459 | 27.3% | 66,386 | | | | | |
| 18 | 677,811 | 11,125,246 | 40,756,944 | 27.3% | (10,741) | | | | | |
| 19 | 563,811 | 11,689,057 | 42,688,952 | 27.4% | 34,790 | | | | | |
| 20 | 434,763 | 12,123,821 | 44,160,329 | 27.5% | 30,810 | | | | | |

The appropriate variance adjusted forecast is made for each asset and the valuation tables are constructed to include every asset in the portfolio. The recovery is valued with continuous probabilities at the unit of sale, which in one embodiment is a tranche. In the use of system 28, internal rate of return ("IRR") and variance would then be assessed. Preferred tranches have lower variances for a given IRR. The probability of each tranche's net present value ("NPV") to be above 0 is assessed using the project's discount rate. A discount rate is determined from the opportunity cost of capital, plus FX swap cost, plus risks in general uncertainties inherent in the variances of forecasted cash flow recovery. If it appears that there is more than a five-percent certainty that the project will have a negative NPV, no bid is made. Deal evaluation is by tranche with decision criteria being IRR, risk variance of the IRR in a tranche, estimated willingness and ability of the tranche to pay, time to profit ("TPP") and the risk variance in the payback by tranche, and NPV of the expected cash flow by tranche discounted to risk free rate.

In competitive bid circumstances when the content of asset portfolios is not negotiable, the investor or seller has a strong financial incentive to select only the portions of total assets available for transaction that will give their aggregated financial structure the best risk/return. Meeting minimum risk/return expected values with assets that will have a higher probability of maximum upside probabilities is even more attractive to investors.

The aggregated portfolio is divided into separately marketable sub portfolios or tranches. Each tranch has a forecasted cash flow probability distribution and time duration from prior analytics. These tranches are then given a trial price. The new assets are combined with the existing asset performance of the selling or buying party and subjected to Monte Carlo case generation (with associated cross correlations accounted for).

The tranch selection process includes a random selection of trances not to buy. Once the portfolio effects take on a pattern, the best selection of tranches to purchase, at what price, subject to constraints is found by stochastic optimization.

Using NPV can be misleading due to the effects associated with double discounting which will occur when pessimistic case scenarios are discounted to obtain PV. Using time to profit is used to overcome this limitation and the marginal capital cost or risk free rate is used in the discounting as determined by analysts conducting the evaluation.

Figure 6:
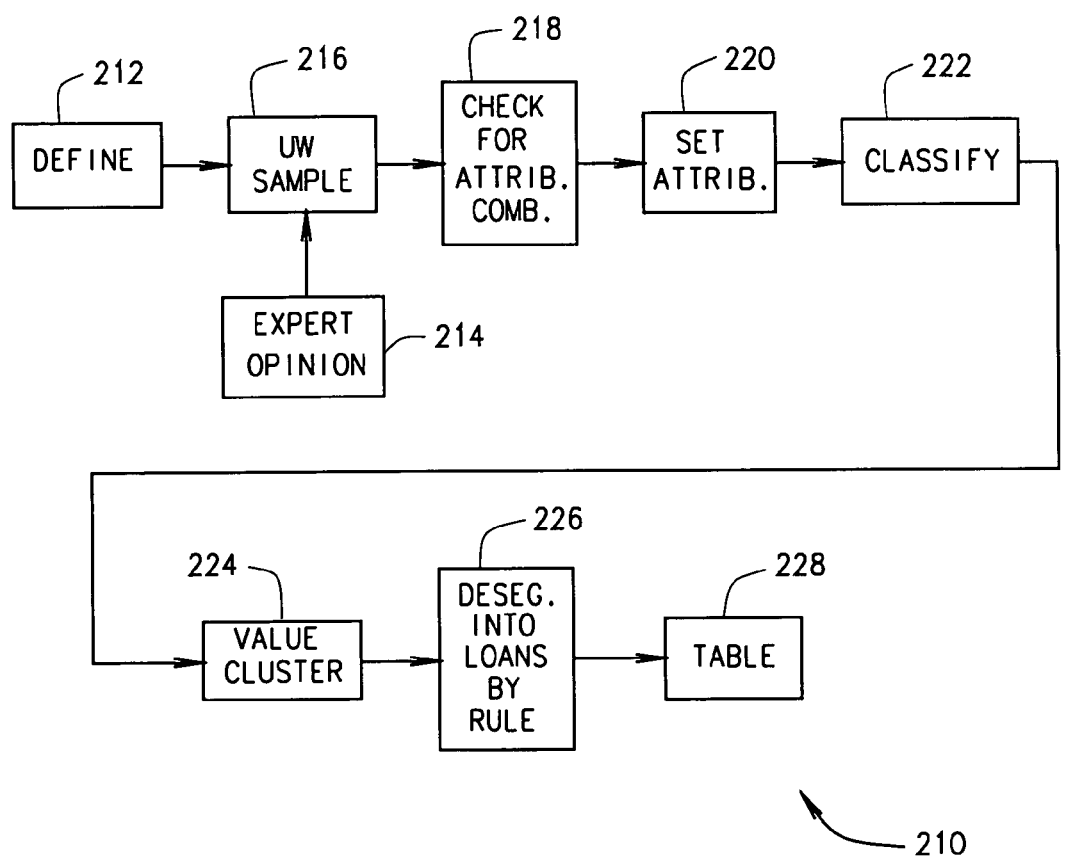
FIG. 6 is a flow diagram of a supervised learning step of the process of FIG. 3.

Supervised learning process 206 of inferred valuation procedure 40 and steps 120, 122 and 126 of partial sampling procedure 108 have substantial similarity in that the underwriter is actively involved in the process, but the process is automated. FIG. 6 is a flow diagram illustrating a process 210 for automated underwriting of segmentable financial instrument assets. First clusters of financial instruments are defined 212 by common attributes. An expert opinion 214 of value is given for selected samples from the defined clusters based upon the attributes. This opinion is used in a sample underwriting process 216 and values are checked for combinations of attributes and reconciled 218. Process 210 then selects and sets 220 the individual attributes to be used and then classifies 222 individual assets into clusters. Cluster valuation is applied 224 to each cluster asset. Using the cluster valuation, the values are desegregated by a rule 226 to create a credit analyst table 228.

Figure 7:
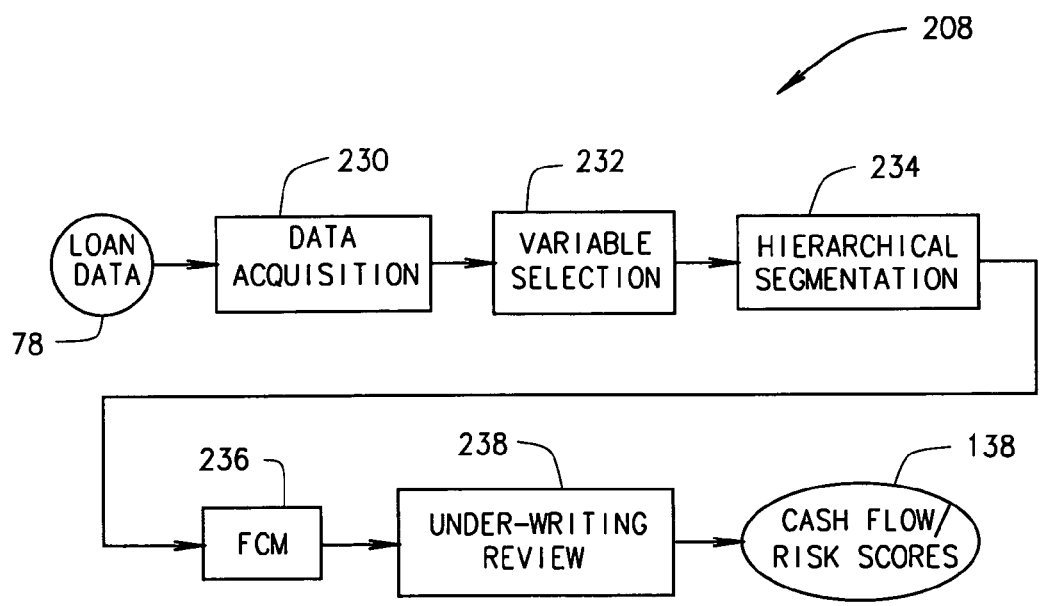
FIG. 7 is a flow diagram of an unsupervised learning step of the process of FIG. 3.

FIG. 7 is a flow diagram of one exemplary embodiment of unsupervised learning 208 that includes several modules. A data acquisition module 230 collects relevant data 78 wherever available. A variable selection module 232 identifies the asset relevant variables deemed critical by credit review or with the most discriminate power in separating various asset groups. A hierarchical segmentation module 234 segments the entire portfolio of assets into bins based on critical variables selected by analysts. A FCM module 236 further classifies each bin into clusters based on natural structure of the asset data. An underwriting review module 238 assigns projected cash flow and risk scores 138 (shown in FIG. 3) to each cluster. This score is then supplied to the individual asset values in credit analyst table 136 for the assets from the clusters being adjusted in procedure 40 to produce adjusted credit analyst table 140. The process is iterative and continuous and can be performed by computer so that it continues while standard underwriting is being performed elsewhere.

Figure 8:
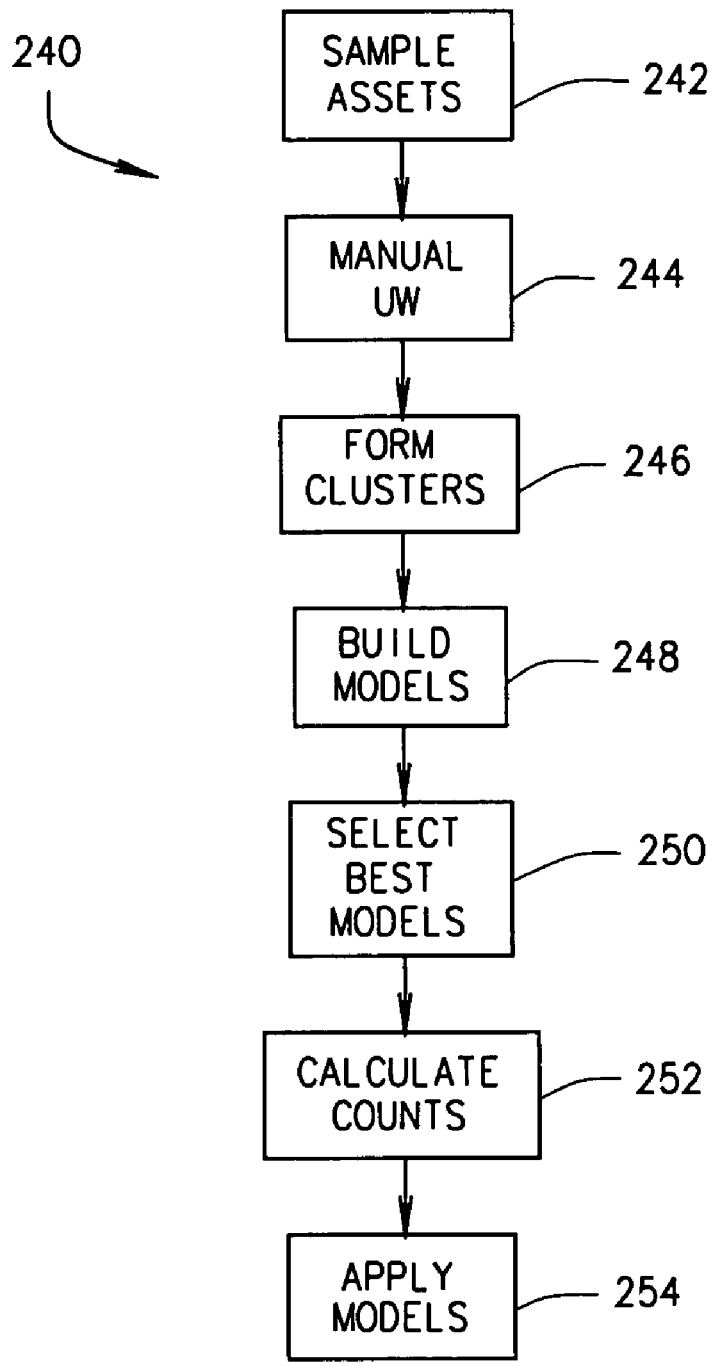
FIG. 8 is an embodiment of the process for unsupervised learning.

FIG. 8 illustrates an alternate exemplary inferred valuation process 240 used in place of the process described in FIGS. 3 and 4. In alternate process 240, a seven-step process is used to rapidly value a real estate loan portfolio using a combination of full underwriting, partial underwriting and inferred valuation. First, assets are sampled 242 according to risk. Second, assets are underwritten 244, and valuations recorded. Third, market value clusters are formed 246, such as by FCM, as described below. Fourth, regression models are built 248, for the underwritten assets. A best model is selected 250, for the underwritten assets from among those built 248 earlier. Sixth, the counts for the selected models are calculated 252. Seventh, models are applied 254, as selected 250 to non-underwritten or inferentially valued portion 42 of portfolio 12 in a manner weighted by the counts to predict individual values for each of the non-underwritten assets. The individual asset values produced according to process 240 are then placed in adjusted credit analyst table 140 (see FIG. 3).

In sampling assets 242, underwriters use stratified random sampling to select assets for detailed review. Strata are constructed from collateral attributes. Examples of collateral attributes for real estate portfolios include, collateral usage (commercial or residential), previous appraisal amount, market value cluster (predicted from previous appraisal amount, land area, building area, current appraisal amount, court auction realized price, property type and property location. Typically, assets are sampled in an adverse manner, i.e., purposely selected from a list ordered by decreasing Unpaid Principal Balance ("UPB") or Previous Appraisal Amount ("PAA").

Underwriting 244 is a largely manual process in which expert underwriters ascribe a notion of worth to collateral assets. The underwritten valuations are stored in a master database table, such as database 76 (shown in FIG. 2). Valuations are typically summarized in terms of monetary units (e.g., 100,000 KRW), at then current market prices.

Figure 9:
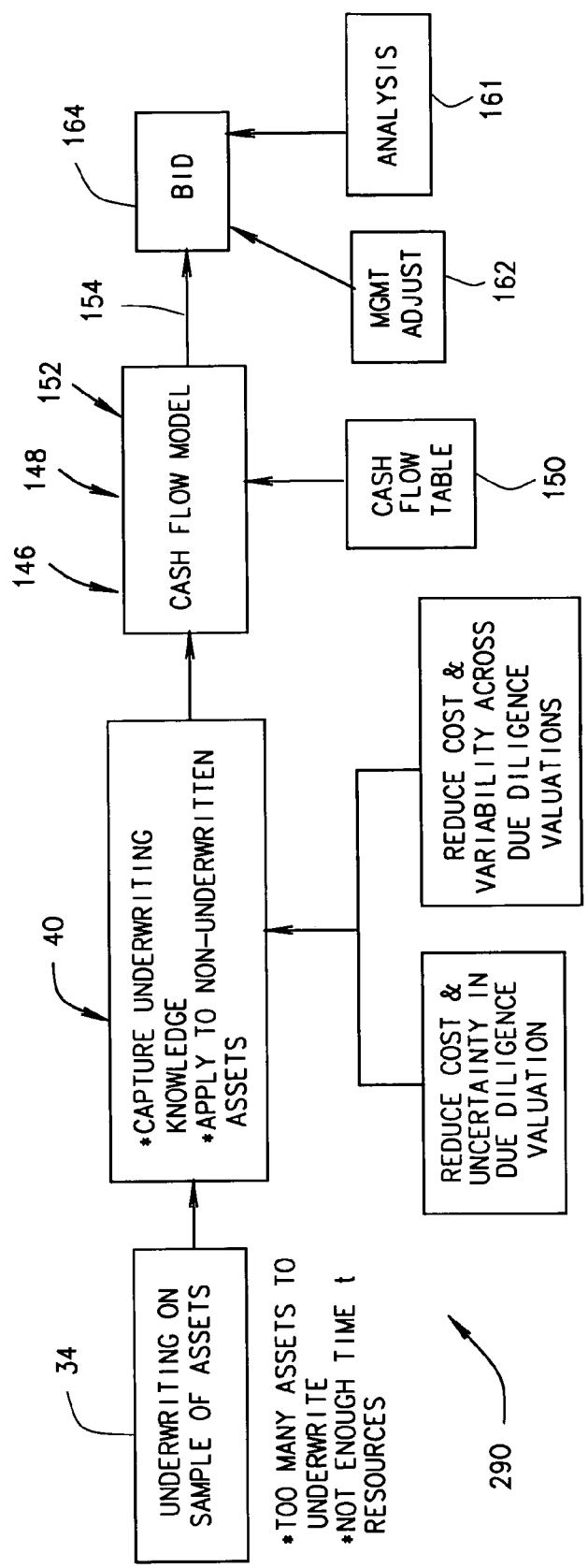
FIG. 9 is an embodiment of the generation 1 (first pass) rapid asset valuation process.

FIG. 9 is a high level overview 290 of the automated portion of the process employed by system 28. Automated procedures are used by underwriters to assist in full underwriting based on procedure 34 (see also FIG. 3). Knowledge captured in procedure 34 is applied in inferred valuation procedure 40 to reduce cost and uncertainty in due diligence valuations of financial instruments and to reduce cost and variability between due diligence valuations. The valuations are subjected to a cash flow model which includes asset level valuation 146, deterministic cash flow bridge 148, stochastic cash flow bridge 152 and cash flow table 150. The resultant bid valuation 154 is subjected to gaming strategies 160 and management adjustments 162 to produce the final bid 164.

Figure 10:
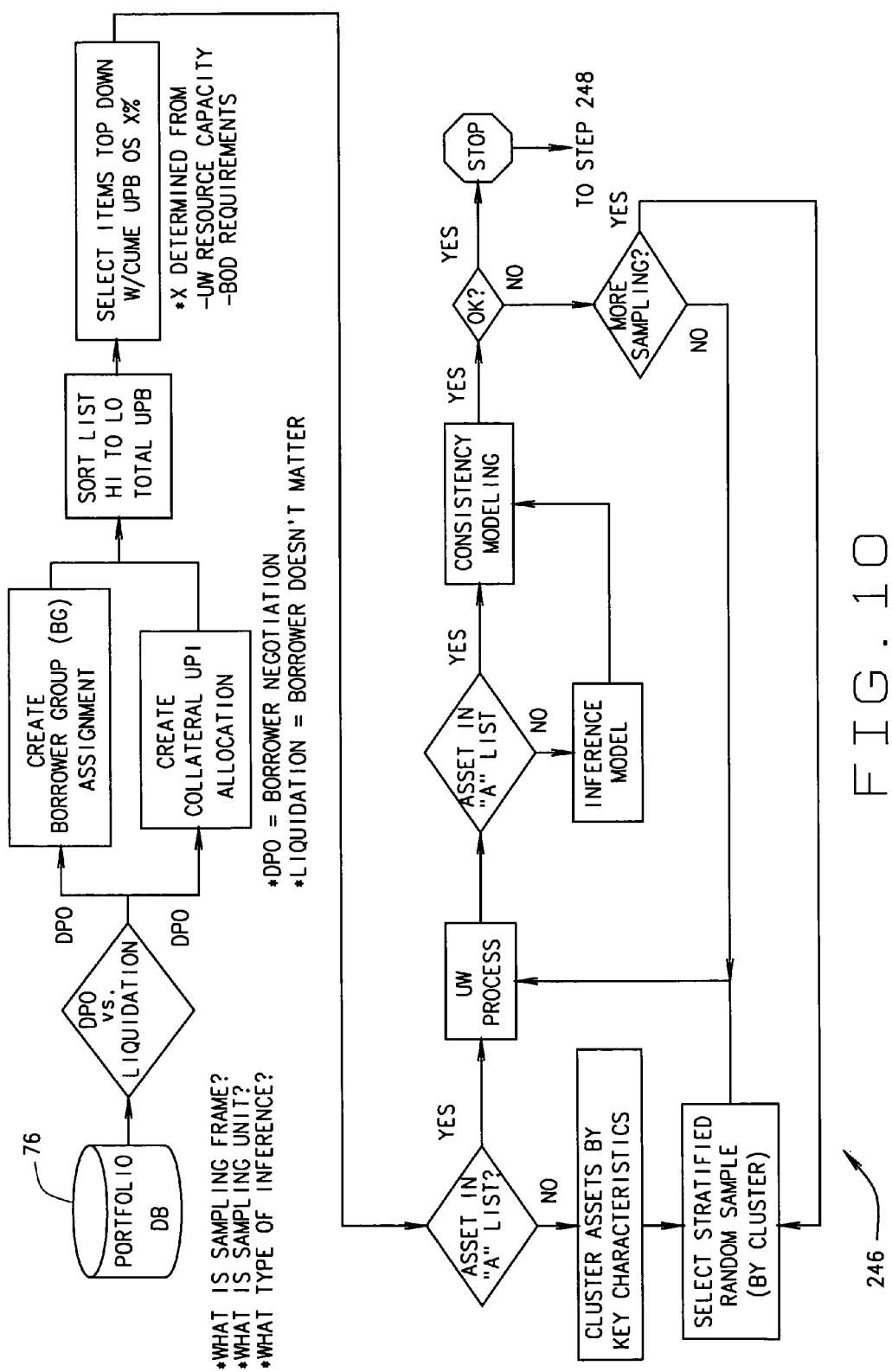
FIG. 10 is a flow diagram of a fuzzy clustering method used in the unsupervised learning of FIG. 8.

FIG. 10 is a flow diagram of an exemplary embodiment of forming clusters 246. In forming clusters 246, underwriters, with the aid of algorithms, such as for example algorithms 134 (shown in FIG. 3) perform an analysis using a classification and regression tree based model, which results in a grouping of UW assets by Collateral Usage and Market Value ("CUMV") groups, using Previous Appraisal Amount ("PAA") as the driving variable.

Two approaches to assess the performance of a classification and regression tree based model are outlined below. One approach utilizes a ratio of the sum of squared error (SSE) of a classification and regression tree based approach to that of a simple model, called an error ratio. A simple model is a model which assigns an average asset price to all assets. The second approach computes a coefficient of determination, denoted as $R^2$, and defined as $R^2=1-(SSE/SST)$, where SST is a sum of squares total.

$R^2$ is the contribution of a single asset within each segment relative to the entire population, a higher $R^2$ value for an asset within a particular segment, the higher is the contribution. The different portfolio segments are ranked based on the two approaches giving an indication of how good the predictive capabilities of the model are within each portfolio segment, giving a comfort level to the bidder in terms of pricing, for example, each tranche.

A first step is to define relevant portfolio segmentations. The segmentations could be pre-defined tranches, for example, based on industry, Unpaid Balance (UPB) amounts, region or customer risk. Table C above is an example of defined segments based on tranches and asset rankings (B or C).

Table C provides an example output from a study of a portfolio with five tranches and two different asset types (B and C). The table shows how the error ratio is ranked for the different segments. Also, the $R^2$ values for each asset are also computed for assets of type C within each segment.

A second step is to compute SSE values for each portfolio segment of interest for the classification and regression tree model and for the simple model (extrapolation of an average price). An error ratio is computed from the SSE based on the classification and regression tree model divided by an SSE based on the simple model. If the error ratio is less than one, then the classification and regression tree based model is a better predictor than the simple model. As an added benefit, a superior model can be assembled as a "hybrid" combination of the classification and regression tree and simple models, by choosing the model which performs best in each segment, according to the error ratio metric.

TABLE C

Rank Error Ratios and $R^2$ value per asset

| Tranche CO | Data | B | C | Grand Total | Rank Error Ratio for C loans | R-Squared pe Loan for C loans |
|---|---|---|---|---|---|---|
| CO 01 | Sum of a Curr UPB THB | 645,949,109 | 82,692,009 | 728,651,119 | | |
| | Count of Loan No | 66 | 10 | 76 | | |
| | Sum of SST | 599,969,990,091,044 | 72,331 126,127 460 | 672,301 116,218,504 | | |
| | Sum of SSE(CART) | 252,088,256,587,362 | 26,877 527,094,865 | 278,965 783,682,227 | | |
| | Sum of SSE(Simple) | 440,700,263,795,025 | 36,637,006,656,009 | 477,337,270,451,034 | 0.733617 | 0.18% |
| CO 02 | Sum of a Curr UPB THB | 58 779,400 | 379,765,147 | 438,544,547 | | |
| | Count of Loan No | 9 | 118 | 127 | | |
| | Sum of SST | 32,332,549,696,133 | 1,039,401,135,208,180 | 1,071,733,684,904,320 | | |
| | Sum of SSE(CART) | 6,139,933,273,655 | 83,849,226,818,428 | 89,989,160,092 084 | | |
| | Sum of SSE(Simple) | 7,037,799,486,368 | 136,366,441,963,041 | 143 404,241,449,409 | 0.614882 | 0.06% |
| CO 03 | Sum of a Curr UPB THB | 798,969,257 | 276,915,573 | 1,075,884,830 | | |
| | Count of Loan No | 98 | 99 | 197 | | |
| | Sum of SST | 2,869,807,879,172,670 | 1,017,087,163,438,760 | 3,886,895,042,611,430 | | |
| | Sum of SSE(CART) | 729 304,505,050,836 | 65,902,258,632,574 | 795,206,763,683,411 | | |
| | Sum of SSE(Simple) | 929 822,648,064,552 | 41,730,444,375,417 | 971,553,092,439,969 | 1.579237 | 0.46% |
| CO 04 | Sum of a Curr UPB THB | 916,281,888 | 184,828,399 | 1,101,110,287 | | |
| | Count of Loan No | 116 | 28 | 144 | | |
| | Sum of SST | 927,232,177,539,735 | 223,991,862,418,471 | 1,151 224,039,958,210 | | |
| | Sum of SSE(CART) | 329,869,566,636,764 | 92,347,778,018,417 | 422,217,344,655,182 | | |
| | Sum of SSE(Simple) | 688,543,329,448,792 | 62,722,788,782,158 | 751,266,118,230,950 | 1.472316 | 0.11% |
| CO 05 | Sum of a Curr UPB THB | 221 769,281 | 41,505,412 | 263,274,692 | | |
| | Count of Loan No | 36 | 19 | 55 | | |
| | Sum of SST | 270,033,444,922,605 | 164,601,058,694,453 | 434,634,503,617,058 | | |
| | Sum of SSE(CART) | 28,547,982,198,098 | 10,191,006,095,769 | 38,738,988,293,867 | | |
| | Sum of SSE(Simple) | 28,897,015,065,918 | 8,519,509,247,449 | 37,416,524,313 367 | 1.196196 | 0.14% |
| Total Sum of a Curr UPB THB | | 2,641,758,934 | 965,706,540 | 3,607,465,475 | | |
| Total Count of Loan No | | 325 | 274 | 599 | | |
| Total Sum of SST | | 4,699,376,041,422,190 | 2,517,412,345,887,330 | 7,216,788,387,309,520 | | |
| Total Sum of SSE(CART) | | 1 345,950,243,746,720 | 279,167,796,660,054 | 1,625,118,040,406,770 | | |
| Total Sum of SSE(Simple) | | 2,095,001,055,860,660 | 285,976,191,024,073 | 2,380,977,246,884,730 | 0.976192 | 0.22% |
| | R-Squared (CART) | 71 4% | 88 9% | 77 5% | | |
| | R-Squared (Simple) | 55 4% | 88.6% | 67 0% | | |

A third step is to compute $R^2$ values for each asset within each portfolio segment. $R^2$ per asset is computed as (SST per segment−SSE per segment)/(overall SST for all assets× number of assets within each segment).

Lastly all the segments are ranked based on the error ratio computed in the second step and the $R^2$ values computed in the third step. The model is accurate in predicting price values for segments that rank high on both of the two metrics, the error ratio and $R^2$ and superior models are assembled using these metrics.

Table D shows the relative ranking of the five tranches for the assets of type C (from Table C) on the basis of the two performance metrics.

TABLE D

| | Portfolio Segment Ranking | | | |
|---|---|---|---|---|
| Tranche CO | C | R-Squared | Rank Error Ratio | Rank R-squared |
| CO 01 | 0.73 | 0.18% | 2 | 2 |
| CO 02 | 0.61 | 0.06% | 1 | 5 |
| CO 03 | 1.58 | 0.46% | 5 | 1 |
| CO 04 | 1.47 | 0.11% | 4 | 4 |
| CO 05 | 1.20 | 0.14% | 3 | 3 |

FIG. 10 is a flow diagram illustrating an exemplary embodiment of forming clusters 246 using FCM to choose clusters for modeling. Computer 38 (shown in FIG. 2) forms clusters 246 by taking selected data 78 and performing FCM analysis to produce the clusters.

FIG. 11 illustrates building models 248, selecting best models 250 and calculating counts 252 in which six models are built using database 76. Computer 38 (shown in FIG. 3) performs this process. Model building 248 is used to assist the underwriter in prioritizing assets for full underwriting 14 and sample-based underwriting 34, as well as for inferential valuation.

The lower portion of FIG. 11 is a table illustrating an exemplary embodiment of selecting best models 250 from six models built in accordance with building models 248d. The models differ according to which variables are used as X's. All models use CUMV Cluster (these are present for all assets). The models from building models 248 are used to predict Court Auction Value ("CAV") 256 in addition to Market Value ("MAV") 258. Other embodiments (not shown) use other models to predict other values In selecting best models 250, the best models of K regression models under consideration (here, K=6), are selected. The best model is chosen for each UW asset, according to the following metric:

$$\min_k \{\text{abs}(y - \hat{y}_k), 1E^{99}\},$$

where y is the UW value to be predicted, and $\hat{y}_k$ is a prediction from the $k^{th}$ regression model, for k=1, 2, ..., K.

In calculating counts 252, the number of times each of the K models is selected within each CUMV cluster is counted. FIG. 11 contains these counts for CAV and MAV modeling scenarios. Other modeling scenarios are used in other embodiments.

When applying models 254, the weighted average prediction from all models that yielded a prediction for each non-UW asset is used. The weights are constructed from the frequencies of the counts calculated 252, and the predictions come from the modeling process. In one embodiment, a commercial statistical analysis software system is used to produce the models. An artifact of using the statistical analysis software system is that each non-UW asset will get a predicted UW value from each model for which the non-UW asset has each input variable, i.e., "X variable" present. Other modeling packages share this trait.) Equation E below details the procedure.

$$\hat{y}_l = \frac{\sum_{i,j,k} I_{lk} f_{ijk} \hat{y}_{lk}}{\sum_{i,j,k} I_{lk} f_{ijk}} \quad \text{(Equation E)}$$

In Equation C, $I_{lk}$=1 if model k produced a prediction for asset l, and is zero otherwise; $f_{ijk}$=count of times model k was selected for UW assets among the $i^{th}$ CUMV type (i=1,2), and the $j^{th}$ CUMV cluster (j=1,2,3); and $\hat{y}_{lk}$=prediction for $y_l$ from model k. Note there is only a contribution from each modeling approach for which an asset has a prediction, with each being weighted by the number of times the modeling approach was selected for all UW assets of the same CUMV cluster.

Process 240 is also used to estimate a Lower Confidence Limit ("LCL") and Upper Confidence Limit ("UCL") for the mean prediction, with a substitution of the corresponding statistic for $\hat{y}_{lk}$ in Equation E.

Referring back again to FIG. 3, supervised learning process 206 and unsupervised learning process 208 use clustering. "Clustering" is a tool that attempts to assess the relationships among patterns of the data set by organizing the patterns into groups or clusters such that patterns within a cluster are more similar to each other than are patterns belonging to different clusters. That is, the purpose of clustering is to distill natural groupings of data from a large data set, producing a concise representation of a system's behavior. Unsupervised learning step 208, employs a fuzzy clustering method ("FCM") and knowledge engineering to group assets automatically for valuation. FCM is a known method that has been widely used and applied in statistical modeling. The method aims at minimizing intra-cluster distance and maximizing inter-cluster distance. Typically the Euclidean distance is used.

FCM 248 (see FIG. 10) at the same time minimizes the intra-cluster distance and maximizes the inter-cluster distance. Typically the Euclidean distance is used. FCM is an iterative optimization algorithm that minimizes the cost function $$J = \sum_{k=1}^{n} \sum_{i=1}^{c} \mu_{ik}^m \|X_k - V_i\|^2 \quad \text{(Equation F)}$$

where n is the number of data points; c is the number of clusters, $X_k$ is the $k^{th}$ data point; $V_i$ is the $i^{th}$ cluster centroid; $\mu_{ik}$ is the degree of membership of the $k^{th}$ data in the $i^{th}$ cluster; m is a constant greater than 1 (typically m=2). Note that $\mu_{ik}$ is a real number and bounded in [0,1]. $\mu_{ik}$=1 means that $i^{th}$ data is definitely in $k^{th}$ cluster, while $\mu_{ik}$=0 means that $i^{th}$ data is definitely not in $k^{th}$ cluster. If $\mu_{ik}$=0.5, then it means that $i^{th}$ data is partially in $k^{th}$ cluster to the degree 0.5. Intuitively, the cost function would be minimized if each data point belongs exactly to a specific cluster and there is no partial degree of membership to any other clusters. That is, there is no ambiguity in assigning each data point to the cluster to which it belongs.

The degree of membership $\mu_{ik}$ is defined by $$\mu_{ik} = \frac{1}{\sum_{j=1}^{c}\left(\frac{\|X_k - V_i\|^2}{\|X_k - V_j\|^2}\right)^{\frac{1}{m-1}}}$$ (Equation G)

Intuitively, $\mu_{ik}$, the degree of membership of the data point $X_k$ in the cluster centroid $V_i$, increases as $X_k$ is getting closer to $V_i$. At the same time, $\mu_{ik}$ would get smaller as $X_k$ is getting farther away $V_j$ (other clusters).

The $i^{th}$ cluster centroid $V_i$ is defined by $$V_i = \frac{\sum_{k=1}^{n}(\mu_{ik})^m X_k}{\sum_{k=1}^{n}(\mu_{ik})^m}$$ (Equation H)

Intuitively, $V_i$, the $i^{th}$ cluster centroid, is the weighted sum of the coordinates of $X_k$, where k is the number of data points.

Starting with a desired number of clusters c and an initial estimate for each cluster center $V_i$, i=1,2, . . . ,c, FCM will converge to a solution for $V_i$ that represents either a local minimum or a saddle point of the cost function. The quality of the FCM solution, like that of most nonlinear optimization problems, depends strongly on the choice of initial values—the number c and the initial cluster centroids $V_i$).

In one exemplary embodiment, the entire portfolio 12 is segmented by unsupervised fuzzy clustering and each cluster is reviewed by under-writing experts. thereby assisting the underwriters in choosing the financial instruments for full underwriting 14 and sample underwriting 34. Alternatively, this FCM can be applied just to portion 42. As a result, each cluster gets assigned a HELTR composite score for purposes of adjustment 138 (see FIG. 3) In essence, the HELTR composite score captures both expected and range of cash flow, its timing and the risk associated with each cluster.

Referring now to FIG. 2, the ratio of full underwrite portion 16 to the total portfolio 12 is in one exemplary embodiment 25% of the assets and 60% of the face value of all assets. Full underwriting of these assets is warranted due to their size and value. However, this underwriting is fairly uniform for all underwriters, so the underwriting is not likely to produce significant bidding variances. The remaining 40%, however, comprising portions 36 and 42, which in the exemplary embodiment constitute 75% of the assets but only 40% of the face value are highly speculative until underwritten. To the extent value can be found in portions 36 and 42*f*, for example without limitation, an additional five percent over gross extrapolation, the difference meaning the difference between winning and losing the entire portfolio bid or the entire tranche bid meaning hundreds of millions of dollars difference in profit.

In the case of insurance policies, in accordance with procedure 40, statistics are used in an attempt to answer three basic questions: (a) How should we collect our data? (b) How should we summarize the data we collected? And (c) How accurate are our data summaries? Algorithm 134 answers question (c), and is a computer-based method without complicated theoretical proofs. Algorithm 134 for insurance policy inferential valuations is suitable for answering statistical inferences that are too complicated for traditional statistical analysis. Algorithm 134 for insurance policy valuation simulates the distribution of statistical estimates by repeatedly sampling with replacement. The algorithm generally is composed of three main steps: (I) Sampling with replacement, (II) Evaluating statistics of interest, and (III) Estimating standard deviation.

In accordance with insurance algorithm 134, estimates of NPV standard error are performed as follows. For each of the risk models and for each segment in the models, assuming there are N policies in the segment, n samples are selected using sampling with replacement (for example, n=100). Each sample contains N policies, too, in this example. For each sample, and for all historical policies:

$$\frac{A}{E_w} = \frac{\sum(Act)}{\frac{\sum(Wtdexp)}{0.72858}}$$ (Equation I)

Next, net present value is generated by $$NPV = \Sigma P - \Sigma E - (\Sigma C) \times \frac{A}{E_w}$$ (Equation J)

for recent policies. Compute the sample standard deviation for the n NPV values. In Equation I, Act is the actual claim and Wtdexp is the weighted expected claim for each individual policy.

FIG. 12 is a table of exemplary criteria 80 and exemplary rule sets for credit scoring 138. Other criteria could be selected depending on the type of financial instrument and particular bidding conditions or any other desires or preferences of the bidder.

Figure 13:
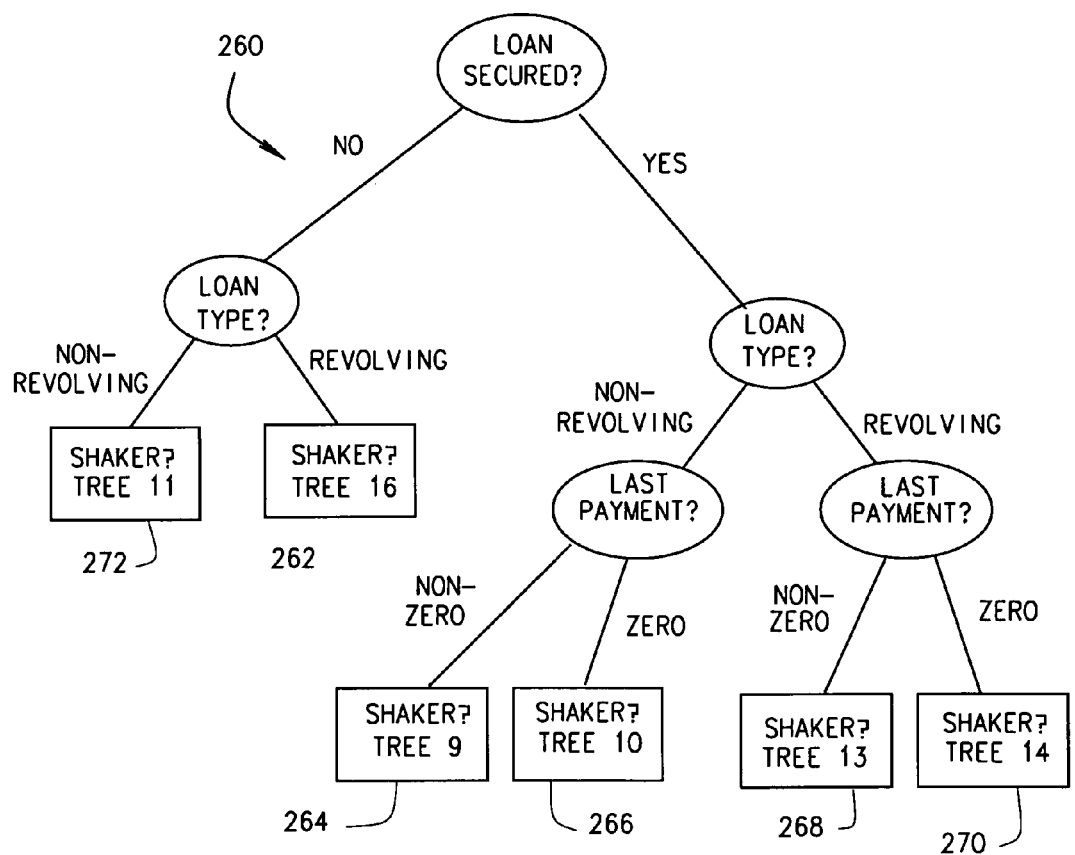
FIG. 13 is a cluster diagram of an exemplary clustering method for a rapid asset valuation process.

FIG. 13 is a more detailed tree chart diagram 260 similar to tree chart 66 (see lower portion of FIG. 2). In FIG. 13, the segregation is by (a) whether secured, (b) whether revolving, (c) whether the last payment was zero. The result is six clusters 262, 264, 266, 268 270, 272, casually known as a tree.

Figure 14:
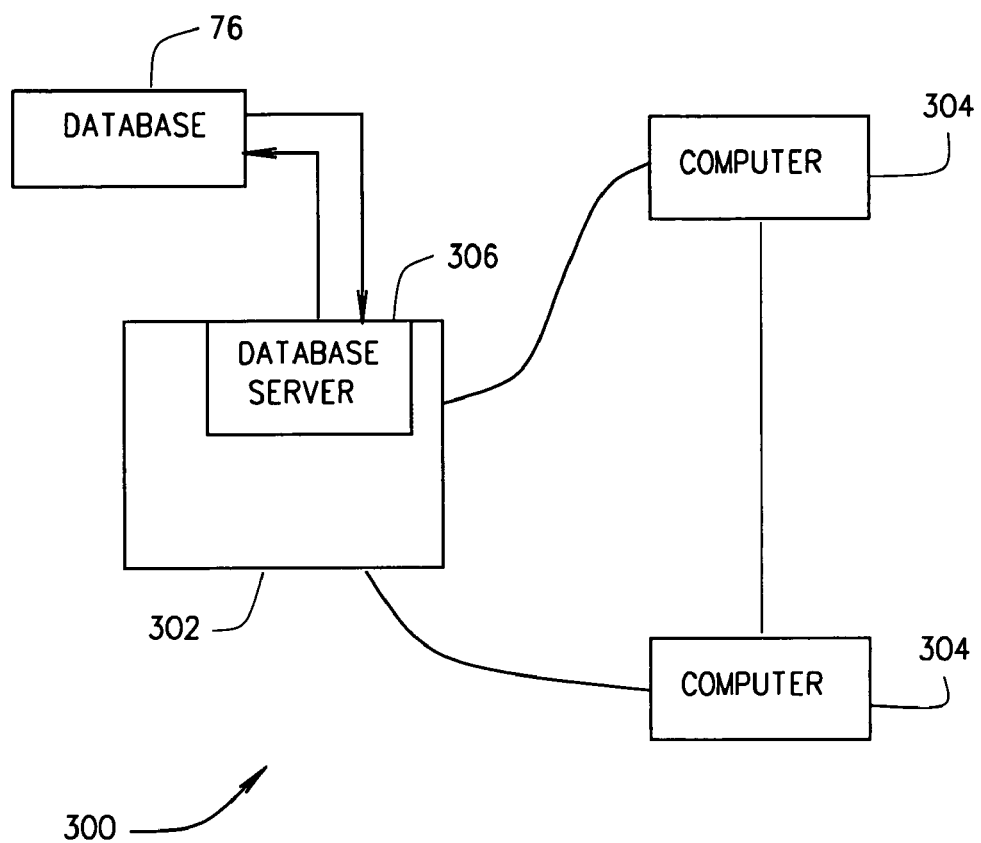
FIG. 14 is a computer network schematic.

FIG. 14 illustrates an exemplary system 300 in accordance with one embodiment of the present invention. System 300 includes at least one computer configured as a server 302 and a plurality of other computers 304 coupled to server 302 to form a network. In one embodiment, computers 304 are client systems including a web browser, and server 302 is accessible to computers 304 via the Internet. In addition, server 302 is a computer. Computers 304 are interconnected to the Internet through many interfaces including a network, such as a local area network (LAN) or a wide area network (WAN), dial-in-connections, cable modems and special high-speed ISDN lines. Computers 304 could be any device capable of interconnecting to the Internet including a web-based phone or other web-based connectable equipment, including wireless web and satellite. Server 302 includes a database server 306 connected to a centralized database 76 (also shown in FIG. 2) which contains data describing sets of asset portfolios. In one embodiment, centralized database 76 is stored on database server 306 and is accessed by users at one of computers 304 by logging onto server sub-system 302 through one of computers 304. In an alternative embodiment centralized database 76 is stored remotely from server 302. Server 302 is further configured to receive and store information for the asset valuation methods described above.

While system 300 is described as a networked system, it is contemplated that the methods and algorithms described herein for examination and manipulation of asset portfolios are capable of being implemented in a stand-alone computer system that is not networked to other computers.

While the invention has been described in terms of various specific embodiments, those skilled in the art will recognize that the invention can be practiced with modification within the spirit and scope of the claims.

What is claimed is:

1. A computer-read method for predicting value of non-underwritten assets for which data representations are partial or incomplete, said method comprising the steps of:
   sampling assets according to risk;
   underwriting assets and recording valuations;
   forming market value clusters;
   utilizing a computer processer to build regression models for underwritten assets;
   selecting the best models for the underwritten assets;
   counting a number of times the models are selected; and
   using the selected model to make a prediction of underwriting value for the non-underwritten assets such that the predicted underwriting value for the non-underwritten assets with partial or incomplete data representations is based on at least one of fully underwritten assets, other non-underwritten assets with complete data representations, and available data from non-underwritten assets with partial or incomplete data representations having similar identifiable characteristics.

2. A method according to claim 1 wherein said step of sampling assets according to risk further comprises the step of selecting assets from a list ordered by at least one of decreasing unpaid principal balance and previous appraisal amount.

3. A method according to claim 1 wherein said step of underwriting assets and recording valuations further comprises the step of storing valuations in a master database, the valuations summarized in terms of monetary units at current market prices.

4. A method according to claim 1 wherein said step of forming market value clusters further comprises the step of performing a classification and regression tree analysis using previous appraisal amount as a driving variable, resulting in a grouping of assets according to collateral usage and market value groups.

5. A method according to claim 1 wherein said step of building regression models for underwritten assets further comprises the step of building models which use as variables different groupings of data representations.

6. A method according to claim 5 wherein said step of selecting the best models for the underwritten assets further comprises the step of selecting models according to $$\min_k \{abs(y - \hat{y}_k), 1E^{99}\},$$

where y is the underwriting value to be predicted, and $\hat{y}_k$ is a prediction from the $k^{th}$ regression model, for $k=1, 2, \ldots, K$, where K is a number of models built.

7. A method according to claim 1 wherein said step of counting a number of times the models are selected further comprises the step of counting a number of times each model produced a best prediction for underwriting of assets.

8. A method according to claim 1 wherein said step of using the selected model to make a prediction of underwriting value for the non-underwritten assets further comprises the step of predicting underwriting value according to $$\hat{\hat{y}}_l = \frac{\sum_{i,j,k} I_{lk} f_{ijk} \hat{y}_{lk}}{\sum_{i,j,k} I_{lk} f_{ijk}}$$

where $I_{lk}=1$ if model k produced a prediction for asset l, and is zero otherwise; $f_{ijk}$=count of times model k was selected for UW assets among the $i^{th}$ collateral usage and market value group type (i=1,2), and the $j^{th}$ collateral usage and market value group cluster (j=1,2,3); and $\hat{y}_{lk}$=prediction for $y_1$ from model k.

9. A method according to claim 8 further comprising the step of estimating at least one of a lower confidence limit and an upper confidence limit for the predicted underwriting value.

10. A method according to claim 9 wherein said step of estimating at least one of a lower confidence limit and an upper confidence limit further comprises the step of substituting a corresponding statistic for $\hat{y}_{lk}$.

11. A system for predicting value of non-underwritten assets for which data representations are partial or incomplete, said system comprising:
   a computer configured as a server and further configured with a database of asset portfolios;
   at least one client system connected to said server through a network, said server configured to sample assets according to risk, underwrite assets and record valuations, form market value clusters, build regression models for underwritten assets, select the best models for the underwritten assets, count a number of times the models are selected and use the selected model to make a prediction of underwriting value for the non-underwritten assets such that the predicted underwriting value for the non-underwritten assets, other non-written assets with complete data representations, and available data from non-underwritten assets with partial or incomplete data representations having similar identifiable characteristics.

12. A system according to claim 11 wherein said server configured to select assets from a list ordered by at least one of decreasing unpaid principal balance and previous appraisal amount.

13. A system according to claim 11 wherein said server configured to store valuations in a master database, the valuations summarized in terms of monetary units at current market prices.

14. A system according to claim 11 wherein said server configured to perform a classification and regression tree analysis using a previous appraisal amount as a driving variable, resulting in a grouping of assets according to collateral usage and market value groups.

15. A system according to claim 11 wherein said server configured to build models which use as variables different groupings of data representations.

16. A system according to claim 15 wherein said server configured to select models according to $$\min_k\{\text{abs}(y - \hat{y}_k), 1E^{99}\},$$

where y is the underwriting value to be predicted, and $\hat{y}_k$ is a prediction from the $k^{th}$ regression model, for k=1, 2, ..., K, where K is a number of models built.

17. A system according to claim 11 wherein said server configured to count a number of times each model produced a best prediction for underwriting of assets.

18. A system according to claim 11 wherein said server configured to predict underwriting value according to $$\hat{\hat{y}}_l = \frac{\sum_{i,j,k} I_{lk} f_{ijk} \hat{y}_{lk}}{\sum_{i,j,k} I_{lk} f_{ijk}}$$

where $I_{lk}$=1 if model k produced a prediction for asset l, and is zero otherwise; $f_{ijk}$=count of times model k was selected for UW assets among the $i^{th}$ collateral usage and market value group type (i=1,2), and the $j^{th}$ collateral usage and market value group cluster (j=1,2,3); and $\hat{y}_{lk}$=prediction for $Y_1$ from model k.

19. A system according to claim 18 wherein said server configured to estimate at least one of a lower confidence limit and an upper confidence limit for the predicted underwriting value.

20. A system according to claim 19 wherein said server configured to substitute a corresponding statistic for $\hat{y}_{lk}$.

21. A computer configured to predict value of non-underwritten assets for which data representations are partial or incomplete, said computer including a database of asset portfolios, said computer programmed to:
sample assets according to risk;
underwrite assets and record valuations;
form market value clusters;
build regression models for underwritten assets;
select the best models for the underwritten assets;
count a number of times the models are selected; and
use the selected model to make a prediction of underwriting value for the non-underwritten assets such that the predicted underwriting value for the non-underwritten asserts with partial or incomplete data representations is based on at least one of fully underwritten assets, other non-written assets with complete data representations, and available data from non-underwritten assets with partial or incomplete data representations having similar identifiable characteristics.

22. A computer according to claim 21 programmed to select assets from a list ordered by at least one of decreasing unpaid principal balance and previous appraisal amount.

23. A computer according to claim 21 programmed to store valuations in a master database, the valuations summarized in terms of monetary units at current market prices.

24. A computer according to claim 21 programmed to perform a classification and regression tree analysis using a previous appraisal amount as a driving variable, resulting in a grouping of assets according to collateral usage and market value groups.

25. A computer according to claim 21 programmed to build models which use as variables different groupings of data representations.

26. A computer according to claim 25 programmed to select models according to $$\min_k\{\text{abs}(y - \hat{y}_k), 1E^{99}\},$$

where y is the underwriting value to be predicted, and $\hat{y}_k$ is a prediction from the $k^{th}$ regression model, for k=1, 2, ..., K, where K is a number of models built.

27. A computer according to claim 21 programmed to count a number of times each model produced a best prediction for underwriting of assets.

28. A computer according to claim 21 programmed to predict underwriting value according to $$\hat{\hat{y}}_l = \frac{\sum_{i,j,k} I_{lk} f_{ijk} \hat{y}_{lk}}{\sum_{i,j,k} I_{lk} f_{ijk}},$$

where $I_{lk}$=1 if model k produced a prediction for asset l, and is zero otherwise; $f_{ijk}$=count of times model k was selected for UW assets among the $i^{th}$ collateral usage and market value group type (i=1,2), and the $j^{th}$ collateral usage and market value group cluster (j=1,2,3); and $\hat{y}_{lk}$=prediction for $y_l$ from model k.

29. A computer according to claim 28 programmed to estimate at least one of a lower confidence limit and an upper confidence limit for the predicted underwriting value.

30. A computer according to claim 29 programmed to substitute a corresponding statistic for $\hat{y}_{lk}$.

* * * * *